United States Patent [19]

Andreaggi et al.

[11] 3,911,481

[45] Oct. 7, 1975

[54] VISUAL AND MAGNETIC RECORDING SYSTEMS

[75] Inventors: Joseph R. Andreaggi, Short Hills; Robert J. Graf, Newark; Matthew J. Relis, Teaneck, all of N.J.

[73] Assignee: Joseph R. Andreaggi, Short Hills, N.J.

[22] Filed: Dec. 28, 1973

[21] Appl. No.: 429,206

Related U.S. Application Data

[62] Division of Ser. No. 250,872, May 8, 1972, Pat. No. 3,823,405.

[52] U.S. Cl. .......... 360/4; 197/9

[51] Int. Cl. .......... G11b 5/08

[58] Field of Search .......... 360/4, 1; 235/61.12 M; 346/33 A, 33 M; 101/90; 197/9

[56] References Cited

UNITED STATES PATENTS

| | | | |
|---|---|---|---|
| 3,413,624 | 11/1968 | Murdoch et al. | 360/4 |
| 3,711,655 | 1/1973 | Yamada | 360/4 |
| 3,756,365 | 9/1973 | Markakis | 360/4 |

*Primary Examiner*—Vincent P. Canney
*Attorney, Agent, or Firm*—Jerry M. Presson

[57] ABSTRACT

Disclosed is a system for visually and magnetically recording data indicative of characters on opposite sides of a paper sheet having a magnetizable backing. The data are recorded with a typewriter which includes a head for recording coded magnetic bits indicative of each character visually printed on the sheet. The head is coreless and is comprised of a plurality of windings, only certain of the windings write or record bipolarity magnetic bits onto the backing, the remaining windings serve as both spacer and erase windings. Recording is accomplished by feeding large amplitude, short duration current pulses to the recording windings. The magnetic bits for each magnetically recorded character are selectively erased by applying bipolarity, low duty-cycle pulses of successively lower amplitudes to the backing by way of the windings and different modes of erasing various areas on the recording medium are disclosed. Also disclosed is a system for decoding the magnetic bits stored on the backing, wherein a head sequentially scans a rotating line of magnetic bits and sequentially reads out each character of the line. The entire document is read by stepping the head from line to line.

7 Claims, 19 Drawing Figures

VISUAL AND MAGNETIC RECORDING SYSTEMS

This is a division of application Ser. No. 250,872, filed May 8, 1972, now U.S. Pat. No. 3,823,405.

The present invention relates generally to systems for providing a visual and a corresponding magnetically encoded record of data and more particularly a system wherein the recorded data is stored on a single medium in both visual and magnetic modes with fixed positional correlation therebetween.

Prior art systems of the type presently under consideration typically employ permanent magnets mounted on type bars of a typewriter, the permanent magnets being located either within or below the print font. In these systems, the magnetic data is recorded coincidentally as visual data is typed on an opaque paper sheet having a magnetic backing thereon or impregnated with magnetic material. When a key of the typewriter is struck, by an operator's finger, permanent magnets are translated into contact with, or in close proximity to, the magnetic portion of the sheet thereby generating magnetic flux on the surface of the sheet being imprinted. Paper thickness and magnetic characteristics prevent effective recording through a paper sheet to a magnetic backing record with permanent magnets that strike the sheet from the paper or front side. Hence, those system wherein magnetic data is recorded by relying upon magnetic flux being transmitted through a sheet of paper to a magnetic backing are most likely not sufficient to enable detection of the magnetically recorded data without appreciable error. While errors may not be introduced by recording on a sheet of paper having magnetic material, such as ferromagnetic particles, impregnated therein, such a sheet generally takes on the dark hue of the black particles embedded therein making it difficult to discern the data visually recorded thereon. Also, erasure of typed material from paper having magnetic material embedded therein is impractical because of adverse effects on the appearance of the printed material on the sheet and irregularities likely to be introduced by erasing on the magnetic surface. Such irregularities may cause problems in correctly detecting recorded magnetic flux during read-back.

Another disadvantage of systems wherein permanent magnets are carried on the faces of type bars is that codes for space, tab or carriage return functions cannot be included without providing special type bars on the typewriter. Without tab or carriage return codes being introduced onto the magnetic medium, the time required for reading out information from the magnetic record is considerably increased over the time required for records that carry such information. If no space code is provided on the recording medium, it is essential that the medium carry some suitable type of timing or synchronizing tracks, in which case the recorded data cannot be considered as self-clocking or self-synchronized.

Another disadvantage of systems employing permanent magnets on type bar faces is that the magnet flux level decreases in response to each mechanical strike against a platen. Eventually, the magentic flux level in the magnets could quite conceivably be reduced to a point where sufficient magnetic flux is not recorded on the magnetic medium and accurate reproduction of data during read-back does not occur. While magnets may be recharged through the utilization of special equipment, the recharging operation is a costly and time-consuming operation. In addition, an operator is not usually apprised as to when recharging is necessary.

In certain prior art systems permanent magnets are carried within the character head itself. These systems, in addition to suffering from the previously discussed disadvantages, are likely to have the character head structure so weakened mechanically that a head might be broken after little use. Another disadvantage attendant with systems wherein magnets are mounted on the head is that small characters, such as commas and periods, cannot carry the magnets because there is not enough surface area on the character head for more than one magnet. In consequence, a character such as a period or comma that is always located in the lower center portion of the key face cannot be distinguished if a permanent magnet is embedded in the character itself.

Systems wherein permanent magnets are placed beneath the print character head are beset by additional problems. In general, only upper case print fonts can be utilized in such systems because the lower case character is usually replaced with a magnet structure. While some systems proposed have both upper and lower case fonts, with two magnets extending below the characters, it is believed that these systems are not practical because different typewriters have different sized platens and platens frequently become so out-of-round after any extended period of use. The problems of platen size and out-of-roundness are also prevalent with the systems wherein a magnet replaces a lower case character because the magnet and the upper case character must both simultaneously strike a rounded portion of the platen.

Another problem associated with having a magnet below the print character is that the magnetically recorded data may not properly be written onto the magnetic medium at the bottom of the page. As is well known, typing personnel frequently are not aware of the fact that they are typing on the last line of a sheet of paper, or type below a point where the paper stays horizontally aligned with the result that magnetically recorded data below the line becomes difficult to detect accurately. The possibility of incomplete erasures of erroneous magnetic bits is also likely in these systems.

In a second class of prior art systems, electric signals are generated in response to the activation of each key on a typewriter keyboard, with different codes representing each key. In response to the electric signals, different discrete areas or spots on a magnetic recording member are magnetized at a plurality of horizontal and vertical matrix positions having a total area equal approximately to the area required for a character. Because a plurality of horizontal parallel lines are utilized to represent each character magnetically, a single head is not feasible for reading back all of the data associated with a particular character. Moreover, because the number of magnetic spots recorded for each character is variable and the spots are at different positions, the record formed with these systems is not self-clocking and hence synchronizing tracks must be provided.

In addition to the aforementioned problems, this system typically suffers from a lack of complete keyboard encoding functions, such as spacing, carriage return, shifting between upper and lower case and character deletion.

The aforementioned disadvantages of known prior art systems are essentially overcome by the system of the instant invention. The instant system utilizes a single, flexible recording medium, to record in the visually readable and magnetic modes. More specifically, the medium is constituted of a paper sheet of suitable color, such as white, having a portion of one surface covered with a thin, ferromagnetic film or strip. In response to each key activation of an encoding typewriter, bi-polarity magnetic data bits are applied to discrete surface areas of the magnetic film. The magnetic data representative of each character is applied to the magnetic film by means of a coreless magnetic recording head formed of a plurality of conductors. Each conductor is selectively pulsed by a current in accordance with a code representative of the selected and depressed key. In one particular embodiment, eight bits are recorded for each character of functional operation (e.g., space bar activation). Included are shift key and parity bits, whereby both lower and upper case characters may be inscribed on and read from the record and self-clocking can be realized. By applying bi-polarity data to the magnetic record the same number of bits is recorded for each character. By applying this data to the record serially, monotracks of data are obtained which represent serial character and functional key selections and activations, and therefore the record is completely self-clocking and no synchronizing track is required.

The magnetic recording head is positioned above and behind the location where a type bar comes into contact with a sheet on the platen and the conductor of the recording head are preferably in direct contact with the surface of the magnetizable film to achieve optimum flux-coupling between current-carrying conductors of this head and the magnetic recording medium. By positioning the recording head above the point where the type bar contacts the sheet the problem of run-off of data magnetically recorded at the bottom of the page is obviated. The problem of run-off at the top of the sheet normally does not arise because an operator normally allows enough spacing or heading at the top of each page to permit contact between the recording head and the magnetizable film.

A magnetic recording head constructed in accordance with the present invention comprises a plurality of conductors, having extremely small cross-sectional areas, positioned to contact the magnetic recording medium. In a typical recording head, 36 conductors are provided, with eight of the conductors supplying flux to the record and the remaining conductors serving as spacers between the flux-supplying conductors. In one embodiment, the conductors comprise a plurality of single turn wires, whereas in a second embodiment the conductors take the form of extremely thin strips. In both embodiments, the several conductors have parallel longitudinal displaced axes. The conductors are topologically arranged so that the magnetic flux recorded thereby never exceeds the space required for the largest character typed by non-proportional typewriters.

To enable sufficient bi-polarity magnetic flux to be imparted by the conductors to the magnetic medium, the conductors are pulsed with currents having an extremely large peak amplitude and a short enough duration to prevent the conductors from being destroyed. We have found that current pulses having approximately 20 amperes peak value and 30 microsecond duration impart sufficient flux to the record to enable accurate results to be attained. The circuit utilized for generating these pulses comprises essentially a capacitor and a switch, such as a silicon-controlled rectifier. Charge stored on the capacitor is dumped through the silicon-controlled rectifier when a gate electrode of the rectifier is activated.

It is, accordingly, an object of the present invention to provide a new and improved medium embodying human readable alphanumeric and magnetic data in fixed relative positional relationships and a system for encoding such data on the medium.

An additional object of the present invention is to provide a new and improved system for recording human readable alphanumeric visual and magnetic data on a single flexible sheet wherein coded signals derived in response to a key being activated cause bi-polarity magnetic signals to be recorded on the sheet.

A further object of the present invention is to provide a new and improved medium carrying human readable and magnetically recorded data, wherein the magnetically recorded data are self-clocking, and a system for recording such data on the medium.

Another object of the present invention is to provide a system for recording human readable visual and magnetic data on a single sheet in a 1:1 positional relationship, wherein problems associated with platen size and out-of-roundness are obviated.

An additional object of the invention is to provide a system for typing human readable visual characters and for recording magnetic data on a paper sheet having a magnetic backing, wherein magnetic flux is applied directly to the backing without being transmitted through the paper.

Still another object of the present invention is to provide a human readable visual and magnetic recording system wherein monotracks of magnetically recorded data are accurately spaced from corresponding monotracks of the visually readable data.

Still a further object of the present invention is to provide a new and improved system for recording human readable visual and magnetic data in 1:1 positional relationship on a single sheet wherein the necessity for the use of permanent magnets is obviated.

Yet another object of the present invention is to provide a new and improved magnetic recording head capable of bit packing densities on the order of 160 bits per inch with static in situ recording and erasing capabilities.

Still another object of the present invention is to provide a coreless record head for recording magnetic bits on a magnetic medium.

A further object of the invention is to provide a sheet carrying human readable and magnetic data in single spaced line relationship of upper and lower case alphanumeric characters, and to a system for recording same.

A further feature of the present invention relates to the apparatus employed for selectively erasing magnetically recorded data from the record. In prior art systems for recording visual and magnetic data in a prescribed, fixed positional relationship wherein erasing is proposed, it is accomplished by saturating the magnetic medium.

In accordance with the present invention, erasing of the medium is accomplished by degaussing. In degaussing, the magnetic flux of the erased area is reduced below a detectable level for read-back purposes. This is accomplished by feeding a multiplicity of low duty cycle bi-polarity pulses to the record head. The first pulse in the multiplicity has a relatively high amplitude and succeeding pulses decrease successively in amplitude. In this manner the magnetic flux level on the area of the magnetic record beneath the head is successively reduced, eventually to a level where the read circuit cannot discern a polarized magnetic bit in the area of erasure.

In accordance with another aspect of the erasing apparatus utilized in the present invention, all of the conductors in the head assembly are connected to be responsive to the erasing pulses. Thus, if perfect alignment between the paper and the write head is not maintained, as is likely to occur when a sheet is removed from a typewriter and then re-inserted, previously recorded bits for a particular character are usually erased.

It is accordingly, still another object of the present invention to provide a new and improved system for selectively erasing magnetically recorded characters on a sheet including visual and magnetic data in a prescribed, fixed positional relationship.

Yet still another object of the present invention is to provide a new and improved circuit particularly adapted for degaussing magnetic records with large amplitude current pulses feeding extremely small cross-sectional area conductors.

Still another feature of the present invention relates to a system for reading the recorded data. The recorded data are read bit by bit in sequence as the magnetized backing rotates continuously past a negnetic reading head. The entire record is read by indexing the reading head from one line to the next of the rotating record.

In consequence, yet a further object of the present invention is to provide a new and improved system for reading magnetically recorded data.

The above and still further objects, features and advantages of the present invention will become apparent upon consideration of the following detailed description of several specific embodiments thereof, especially when taken in conjunction with the accompanying drawings, wherein.

THE VISUAL AND MAGNETIC RECORDING MEDIUM

Figure 1:
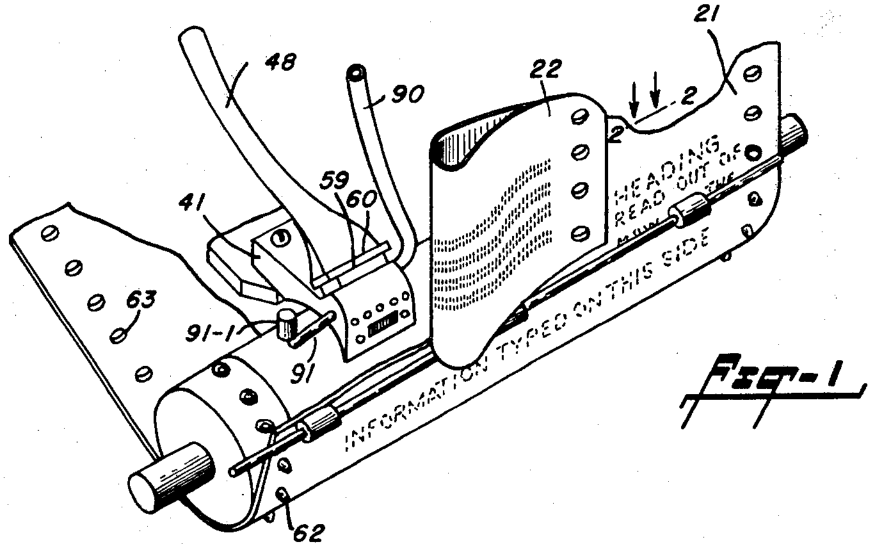
FIG. 1 is a perspective view illustrating the position of the recording head of the present invention relative to a platen and sheet of paper on which human readable and magnetic data are written, the upper left hand portion of the sheet being folded to depict magnetic bits applied thereto by the recording heat in direct correspondence to the characters typed on the front of the paper sheet.
Figure 2:
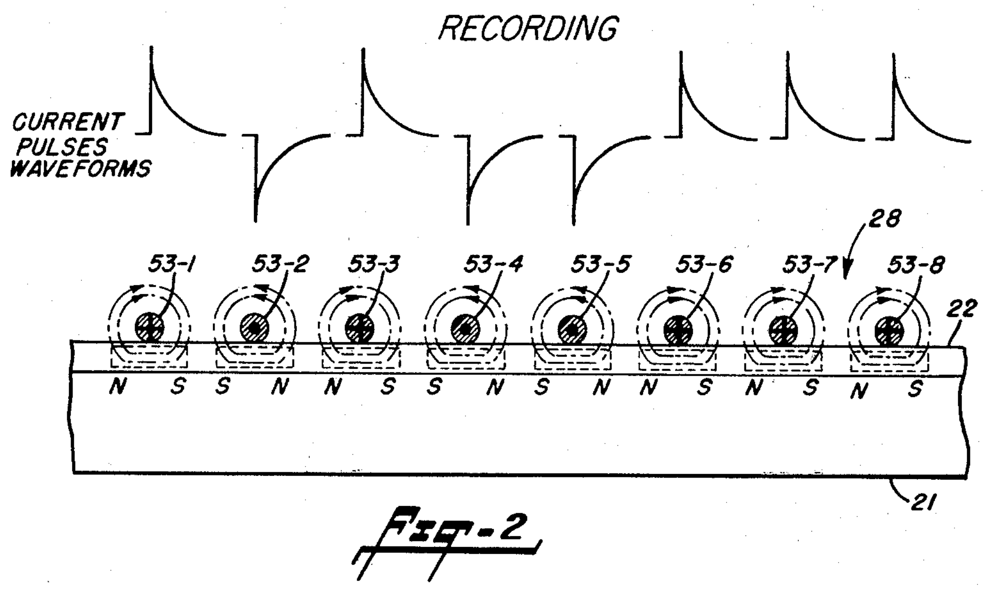
FIG. 2 is a cross-sectional view taken along lines 2—2 of FIG. 1 of the composite sheet of paper and a flexible magnetizable backing integral therewith, and additionally depicts typical electrical current waveforms for writing bipolarity magnetic bits onto the magnetizable backing.

Before proceeding with the detailed description of the apparatus of the present invention, a typical illustration of the data recorded by this apparatus may be had by reference to FIGS. 1 and 2. In these figures, there is illustrated a sheet of conventional bond paper 21 having a thickness on the order of 2 to 3 mils and a flexible backing sheet, coating, film or layer 22 composed of a highly magnetizable material, such as $Fe_2O_3$ or $Fe_3O_4$, upon which magnetic data bits can be recorded and stored. The layer 22 typically has a thickness on the order of 0.5 mil, and may be applied to the entire surface of one side of the paper sheet 21 by conventional methods.

Printed on paper sheet 21 are conventional typewritten alphanumeric characters, FIG. 1, each of which requires essentially the same discrete surface area. Typical conventional typewriters are designed to print 10 characters per inch with each line spaced approximately 0.16 inch apart. On this exemplary basis, each discrete area alloted to, and occupied by, an alphanumeric character has a width dimension of approximately 100 mils and a height dimension of approximately 160 mils. Both upper and lower case letters of a complete 50-key typewriter keyboard can be printed on sheet 21 in single spaced line relationship, if desired. Human readable characters on the same line can be imprinted in succession and adjacent to each other on sheet 21, as in accordance with printing normally associated with and obtainable from a conventional typewriter.

As may be seen from FIG. 1, in vertical alignment with each alphanumeric character printed on sheet 21, there is a particular combination of eight bits of bipolarity magnetic data properly coded to represent any single key on the typewriter keyboard. The data bits are depicted as short vertical lines which together form a single track of magnetic bits on layer 22. An exemplary combination of eight bits is illustrated in FIG. 1. The area encompassing the eight bits is approximately the same width as a typewritten character. Similarly, since these eight bits are the binary-coded representation of one particular character, the height of each of the eight bits is approximately the same as that of the character. Each group of eight bits is recorded simultaneously (or in situ) on the magnetic layer 22 in response to a corresponding key actuation at a position slightly above the corresponding key characterization, whereby a prescribed, fixed or one-to-one positional relationship is provided, between a generated character line and a corresponding multibit magnetic data track comprised of a succession of eight-bit groups. Hence, in FIG. 1 in the word "HEADING" the letter A is typewritten on a line at a position immediately below that where exemplary magnetic bits corresponding thereto are recorded, but the relative positions of the recorded visible and magnetic data along the width dimension of the sheet are aligned.

Therefore, the horizontal rows of alphanumeric data are parallel to, but offset a fixed distance from, the rows of single tracks of magnetic data on the magnetizable side of the recording medium. Each alphanumberic character is also in a prescribed vertical relationship (typically aligned) with each group of eight magnetic bits which are uniquely coded to represent that particular character.

The eight bits of recorded data representing one typed character are illustrated in FIG. 2 as oval lines carrying arrow heads indicating the polarity of the magnetism of the particular recorded bit; the bit polarity is also indicated by the relative positions of the magnetic north and south poles, N and S, on the left and right sides of the associated oval lines. Hence, magnetic 1 bits are represented by these mutually tangential oval lines having arrowheads pointing in the clockwise direction, as well as N and S on the left and right sides thereof. Magnetic 0 bits are of the opposite magnetic polarity and are represented by three mutually tangential oval lines having arrow heads pointing in the counterclockwise direction, as well as by magnetic poles S and N on the left and right sides, respectively, of the associated oval lines. The first six magnetic bits of each eight bit group, FIG. 2, indicate which key on the typewriter keyboard is depressed while the seventh bit indicates if the shift lever is depressed while the character is recorded (upper or lower case character). The last or eighth bit is used as a parity bit for error checking.

The parity check employed in such that an odd number of 1 and 0 bits is derived for each character. To illustrate, for lower case letters *a*, the first six bits may be 101001 while the seventh bit is a 1 bit to indicate that the shift lever was not activated and the eighth bit is also a 1 bit to provide the desired parity check. Upper case letter A would have the same first six bits as *a*, namely 101001, but the seventh bit is recorded as a 0 bit to indicate that the shift key was activated on the keyboard and the last bit is recorded as 0 bit to provide the required odd parity check.

MAGNETIC RECORDING — GENERAL

The eight magnetic bits for each key are created simultaneously on layer 22 by applying a corresponding number of rapidly changing electrical currents to the alloted area on the layer. Each magnetic bit so formed includes a north pole N and a south pole S laterally spaced from each other by a relatively small distance with the orientations of the poles along the width dimension of the paper indicating the code of the recorded character. Each magnetic bit center is spaced from an adjacent bit center a distance sufficient to provide adequate separation between adjacent magnetized areas to obtain a sufficiently well-defined voltage waveform to satisfy the particular system readback requirements. A single track of magnetic bit groups is formed on layer 22 in positional correspondence with a line of characters on sheet 21. As a result, a self-synchronized reading apparatus may be employed to readout the magnetic record.

With reference to FIGS. 4–7 of the drawings, there is illustrated one embodiment of the instant recording apparatus for simultaneously writing a human readable and a magnetic record on the sheet 21 and the layer 22, respectively. The apparatus, FIG. 4, comprises a conventional electric typewriter 26 with a full 50-key keyboard having upper and lower case characters, as well as a backspace key 27, a special erase key 28 for erasing magnetic data, a space bar 29, a carriage return key 30, and a shift key 31.

Erase key 28, space bar 29, carriage return key 30 and shift key 31 all have permanent magnets 32 fixedly mounted on lower extensions thereof. Each of the magnets is movable past an associated reed switch 35 upon depression of its associated key or bar; the reed-like contacts of each switch closing in response to the movement of a magnet therepast.

Electrical signals produced upon reed switch closure indicate which of the erase key 28, space bar 29, carriage return key 30 or the shift key 31 has been depressed by the typist. In addition to the special signals derived in response to depression of keys 28, 30 and 31 and bar 29, a signal is similarly derived upon depression of any of the remaining keys on the typewriter keyboard.

In addition to these signals, all signals produced in response to the depression of the remaining keys on keyboard, other than erase key 28, and the shift key 31 and fed to a diode coding matrix designated generally by numeral 36 via a multi-lead cable 37. The electrical signals fed to the matrix are obtained from closures of individual switches, the state of which, as mentioned above, are under the control of magnets associated with individual keys on the keyboard. Assuming that the remaining keys total fifty, there will be 50 additional switches and 50 additional connecting leads. Matrix 36 is constructed so that if any one of the 50 leads is connected to ground in response to closure of an associated switch by activation of a selected key on the keyboard, eight predetermined binary electrical signals are simultaneously produced on eight conductors leading out of the matrix. The first six bits indicate which key of the keyboard has been depressed, the seventh bit indicates whether the shift key 31 has been depressed and the eighth bit is employed as a parity check. Special codes are associated with spacer bar 29 and carriage return key 30, whereby the binary bit combination for these keys is different from that of any other keys, while preserving the parity check. To preserve the parity check for upper case characters, diode coding matrix 36 includes means for inverting the parity bit for each character in response to activation of shift key 31, as well as means for generating a 0 bit as the seventh bit if the shift key 31 is activated. The eight predetermined signals obtained from the output of the diode coding matrix 36 are applied to the recording circuit 39. High amplitude current pulses generated at 39 pass thru the normally closed relay contacts of a switching circuit 38 to recording head 41, fixedly mounted above a platen 42 in typically horizontal alignment with a type guide 43.

Figure 5:
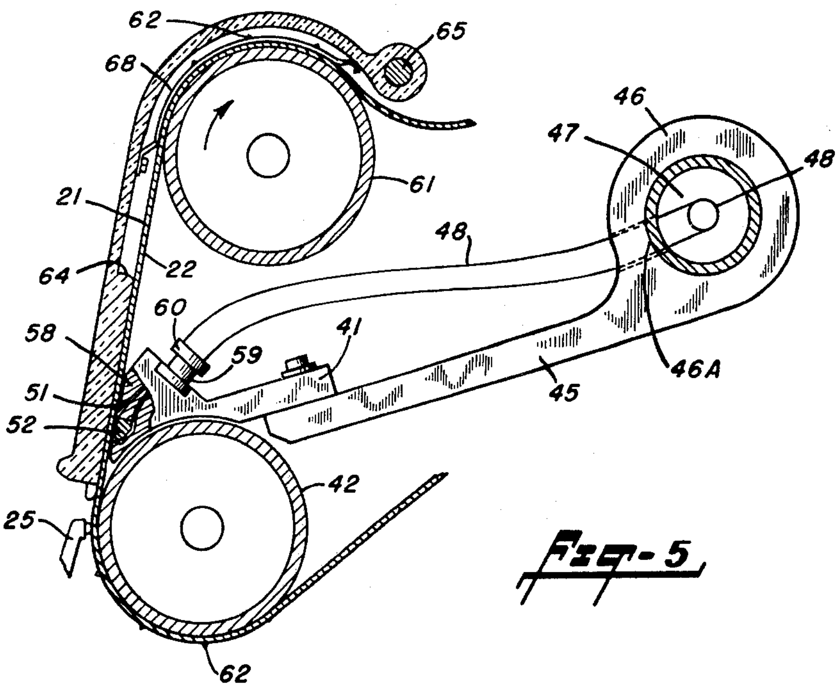
FIG. 5 is a sectional view taken through the lines 5—5, FIG. 4, showing the relationship between the magnetic recording head of the present invention in combination with other parts of the typewriter mechanism.
Figures 6, 7:
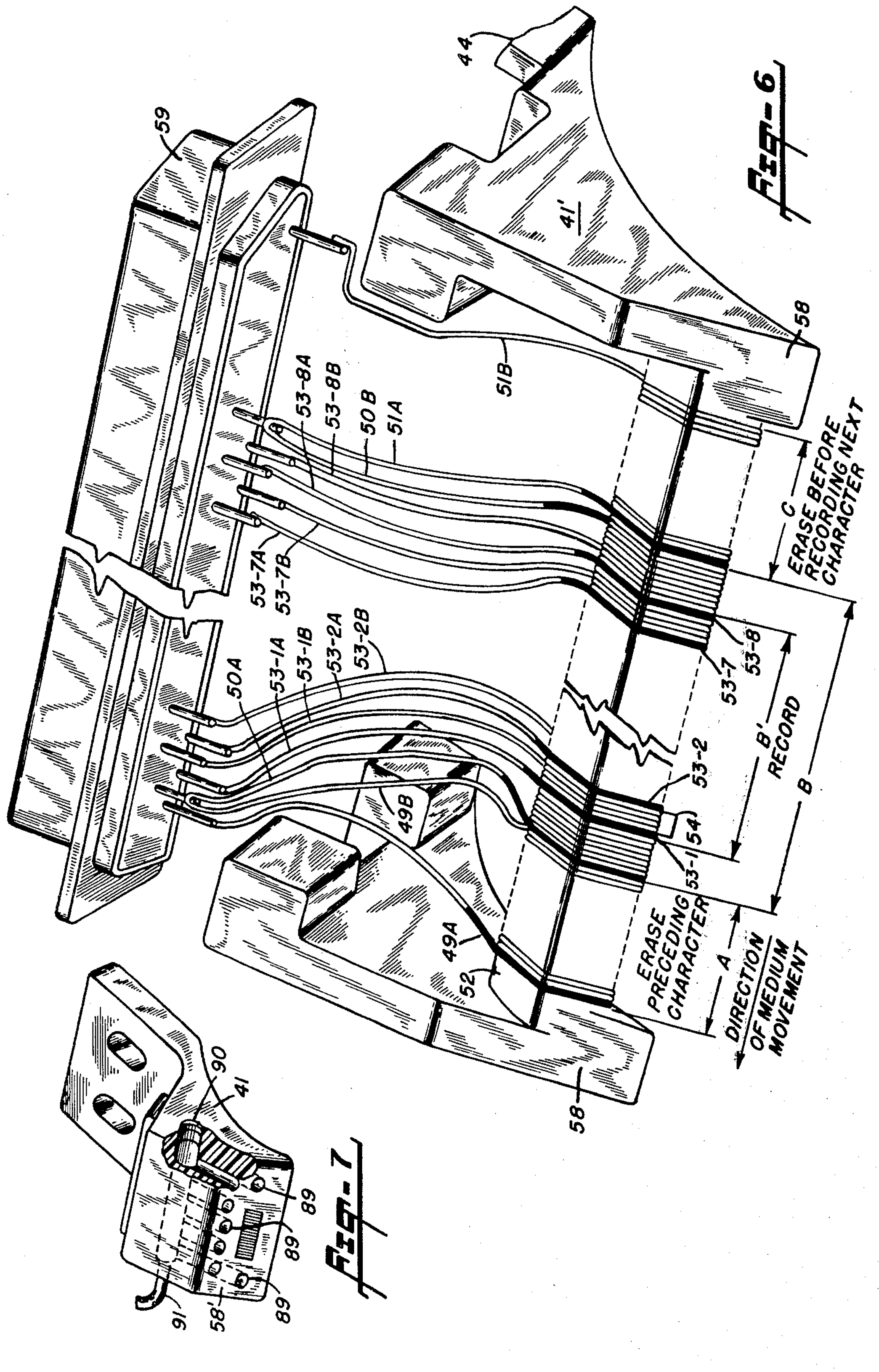
FIG. 6 is an enlarged, perspective view of a portion of a recording head frame and flux-producing windings constructed in accordance with the present invention.
FIG. 7 is a perspective view illustrating a system for vacuum drawing the magnetizable backing into contact with the windings of the recording head.

With reference to FIGS. 1, 5 and 6, a magnetic recording head 41 is fixedly mounted to an arm 45 having an enlarged inner end fixedly mounted on a hollow shaft 47 which in turn is mounted integral with the frame of the typewriter. With the head 41 fixedly positioned centrally of the typewriter frame in typical alignment with the type guide 43. The shaft 47, which carries the arm 46 and head 41, is typically on the order of three times the length of the platen 42 in order to permit the recording of magnetic characters at either edge of the medium 21, 22. Signals from switch 38 are coupled to head 41 by conductors sheathed in a cable 48 and inserted into the shaft 47 and emerging from the interior of the shaft and the arm 46 by way of a bore 46A extending transversely through a portion of the arm and the shaft. Each of the conductors forming cable 48 is connected to one terminal pin of a standard multiterminal connector plug 60, which is manually insertable into connector receptacle 59 of head 41, as indicated by FIGS. 1 and 5.

MAGNETIC RECORDING — DETAILS OF RECORDING HEAD

With general reference to FIG. 6, the head 41 is characterizable as a coreless magnetic head having three sections A,B and C; each equal in width, and typically 100 mils wide, with each section performing a different function determined by a selected mode of typewriter operation. The first section designated A, comprises a plurality of turns, typically 52, of a single, continuous conductor having two end leads 49A and 49B, respectively, which are energized when it is required to erase (by degaussing) a previously recorded character. During an erase mode, in section B, between sections A and C, a discrete magnetizable area of the backing 22 is erased before a recording is made thereon, thereby ensuring a greater accuracy and integrity to recording. To this end, fringe areas at both ends of record section B′ are degaussed by appropriately energizing spaced windings separating section B′ from sections A and C, respectively. Similarly, section A during the erase mode erases the discrete record area and adjacent fringe areas of a previously recorded character. The degaussing of fringe areas also reduces the possibility of nonerased, previously recorded magnetic bits remaining on a reinserted, slightly misaligned paper 21 in the typewriter. In section C, adjoining section B, an area is similarly erased while a preceding character is recorded in section B′. Section C is formed by a plurality of turns of a single, continuous conductor having lead ends 51A and 51B, respectively.

Typically, each conductor is constituted by a copper wire having a diameter of 1.75 mils coated with an electrical insulating layer of polyurethane of 0.1 mil thickness. Each conductor is wound evenly around a mandrel-like portion 52 of the head frame 41′ so that an elongated section of each convolution is in physical contact with the layer 22. Because each section of conductor is coated with insulation, short circuiting is prevented between mutually adjacent conductors. Parts of the recording head 41 other than the conductors wound upon the portion 52, are preferably composed of a suitable insulating material, such as a polymeric or epoxy resin.

For each magnetic bit recorded on the backing 22, only every fifth winding or turn of section B′ (FIG. 6) is energized and the remaining four windings or turns for that bit are utilized as spacers between the energized windings. Eight single conductors are interleaved between certain juxtaposed but spaced-apart convolutions of the continuous winding on the mandrel 52. Each such recording conductor forms less than a complete turn on the mandrel and typically has a portion of length suitably affixed to only the top, bottom and front surfaces of the mandrel as viewed in FIG. 6. Also, each recording conductor is separated by four spaced turns which are merely spacers, and are not supplied with signals. In FIG. 6, numerals 53-1 and 53-2 designate the recording windings for the first and second bits of a character, respectively, and the spacer turns are designated 54. The seventh and eighth record windings are designated 53-7 and 53-8, respectively. Of course, it is to be understood that the dimensions illustrated in FIG. 6 are greatly exaggerated and that the total lateral distance between record winding 53-1 for the first bit of a character and record winding 53-8 for the last (eighth) bit of that character is typically on the order of 68 mils. In the manner described for spacing windings 53-1 and 53-2 for recording the first and second bits, four spacer conductors are utilized to maintain precise separation between each of the six remaining record windings 53-3 . . . 53-8 from one another. Thus, section A is defined by the windings connected to leads 49A and 49B, section B is defined by the windings connected to leads 50A and 50B, said section C is defined by the windings connected to leads 51A and 51B, with leads 49B, 50A and 50B, 51A, respectively, being commonly connected at single terminals. Leads 49B, 50A and 50B, 51A extend from a continuous winding, as disclosed above, and recording lead pairs 53-1A, 53-1B . . . 53-8A, 53-8B, extend from less than single complete turns of corresponding recording windings 53-1 . . . 53-8.

It may be noted that no magnetic core material is employed in the head 41 and that turns having insulation thereon are utilized as spacers between adjacent recording turns. Sufficient magnetic flux is applied by windings 53-1, 53-2 . . . 53-8 to magnetic backing 22 by pulsing these turns with high intensity currents and by allowing these turns to contact the backing 22. As described, infra, ciruitry is provided to pulse windings 53-1, 53-2 . . . 53-8 with currents having peak magnitudes on the order of 20 amperes for approximately 10 microseconds. Such currents create enough flux around the windings to appropriately change the magnetic state of a defined, adjacent area of the layer 22. The extremely large amplitude currents do not overheat the conductors to the point to rupture because of the extremely short time duration of these pulses.

OTHER EMBODIMENTS OF THE RECORDING HEAD

Section B of the head 41 may be modified such that two separate adjacent windings are utilized for recording each bit. In such a configuration, the current flowing through a first one of the two windings is in a direction opposite to the current flowing through the second one of the two windings for the same bit, whereby the first winding is witched to a first current source when the particular bit is a binary 1 and the second winding is switched to a second current source when a binary 0 is to be recorded. As in the case of the FIG. 6 embodiment, the recording windings for each bit are separated by four spacer windings to provide the desired fringe spacings on either side of each magnetic area commensuarate with the area required for a character.

FIG. 7 illustrates another embodiment of a recording head, designated 41, wherein contact between backing 22 and a surface 58' of the head 41 is maintained by a plurality of apertures 89 extending perpendicular to the surface of the head that contacts backing 22. Apertures 89 are formed in the head 41 during the manufacture thereof and communicate with a common bore 90 connected to a suitable source of fluid pressure, such as a vacuum pump (not shown). The pump applies a subatmospheric pressure of approximately 13 pounds per square inch to the backing 22 by way of the aperture 89, this vacuum being sufficient to maintain the record medium in firm contact with the recording winding 53-1. . . 53-8, and is controlled by a solenoid valve 91-1, FIG. 1, installed in tube 91. Alternately, an above atomspheric pressure applied via tube 90, may be controlled by an in-line solenoid valve installed in the tube 91.

According to still another embodiment of the invention, the longitudinal axes of erase and recording windings are mutually orthogonal, that is, positioned at right angles to each other. In such case the erase windings are located on character position on either side of the intermediate section B of FIG. 6 to enable erasing prior to recording or in response to depression of say a backspace key. Thus, the two erase windings would be positioned orthogonal to the windings depicted in sections A and C, respectively, in FIG. 6.

Another embodiment of the invention would place all of the record and erase conductors mutually parallel to each other and spaced one character apart with their respective longitudinal axes aligned. Thus, the two erase windings and record windings would be positioned orthogonal to the windings depicted in sections A, C and B, respectively of FIG. 6.

A further embodiment would place the record conductors orthogonal to the erase conductors and one character apart from one another. Thus, the record windings would be orthogonal to the record winding depicted in section B of FIG. 6.

The windings of the head 41 may be made in the form of thin, flat conductive strips (FIG. 8 and 8A) having a dimension Y perpendicular to the plane of the backing 22 substantially greater than dimension X. Dimension X is proportioned to give a current density that is nearly equal to its counter part wire conductor of FIG. 6.

All other factors being equal, the substantially greater amount of metal available in the strip-like windings provides a somewhat longer lifetime of wear of the recording windingns. FIG. 8 illustrates one set of identical spacer strips 95-1, 95-2 corresponding to two of the spacer windings 54 in section B of FIG. 6 of the recording head prior to connection in electrical series. The strip designated 96 depicts a recording strip corresponding to one of the recording windings 53-1 . . . 53.8 of FIG. 6. Numeral 97 designates a strip corresponding to the first winding of the head to which the lead 49A is joined, FIG. 6. The strips 98-1 and 98-N illustrate representative erase strips in section A of the recording head.

Figure 8A:
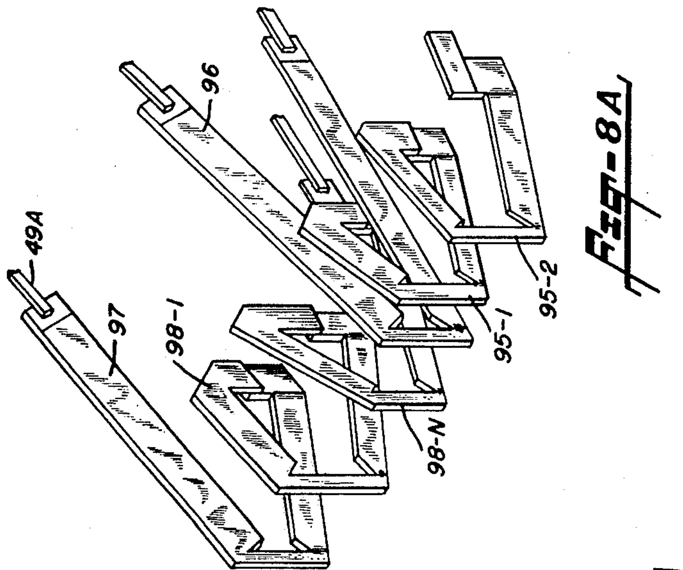
FIG. 8A illustrates a typical arrangement of the interconnected metal strips to provide a recording section for the recording head.
Figure 8:
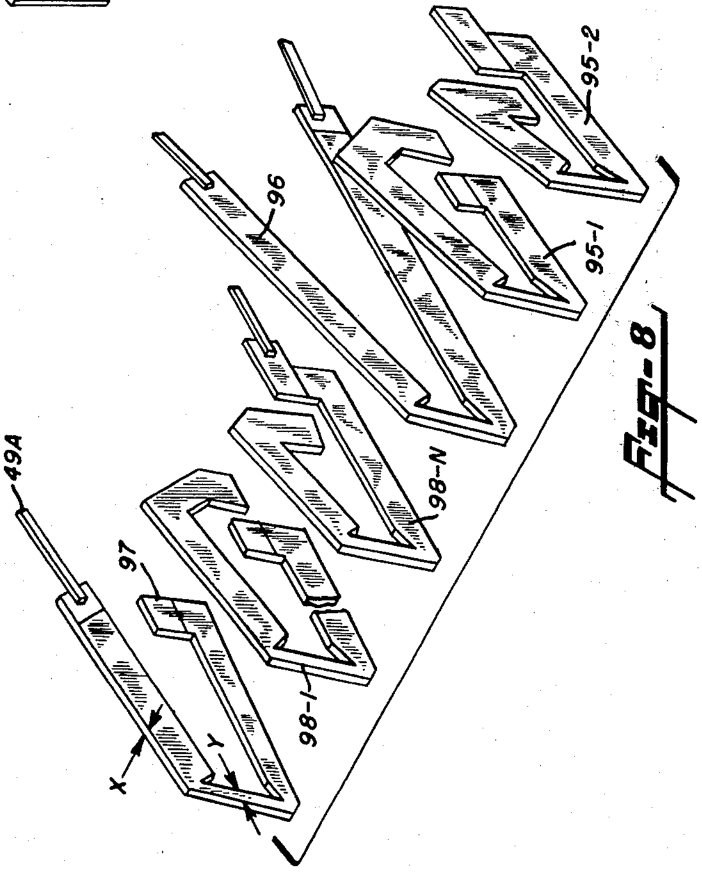
FIG. 8 is a perspective view of a modification of a magnetic recording head wherein thin, metal strips are utilized as recording conductors.

FIG. 8A depicts a typical electrical series connection of the various spacer strips 95 to each other and to an adjacent strip 98-N as well as series connection of the terminal strip 97 to a juxtaposed erase strip 98-1. The strip 98-1 is electrically connected to the strip 97 which receives erase current pulses via the lead 49A. The edges and sides of the various strips may be coated with a layer of a suitable electrical insulating material to prevent short circuits therebetween. The material may be a suitable epoxy compound which adheres to all surfaces of the strips except the forwardmost edge of each strip leg which contacts the backing 22. It will be noted that in order to interleave the recording strip 96 between two other strips such as the strips 95-1 and 98-N, the two parallel legs of each strip are bent in opposite directions out of the strip plane, FIG. 8 and passed between the bifurcated arms of the strip 96. A physical and electrical connection is then made between the respective downwardly and upwarrdly extending end portions of the strips 95-1 and 98-N. Connections are similarly effected between all juxtaposed strips save the strips utilized for recording, such as the strip 96.

MAGNETIC RECORDING — DETAILS OF TYPEWRITER MECHANISM

To ensure that the record windings designated 53-1, 53-2 . . . 53-8 are in virtual contact with the magnetic surface of the layer 22 FIG. 5, the head 41 is placed directly above platen 42 and is contoured along the lower surface to conform closely with the cylindrical portion of platen 42 immediately above the point where type bar 25 strikes the sheet 21.

To maintain the layer 22 is contact with conductors 53-1 . . . 53-8, platen 61 is mounted on carriage assembly 50 approximately directly above platen 42 and has its longitudinal axis extending parallel to the longitudinal axis of the lower platen. Platens 42 and 61 carry radially-projecting pins 62 for engaging pinholes 63 lorection of the current pulse through any one winding is dependent upon which of two circuit inputs is activated. Since each stage is essentially identical to the other seven, a description of only the stage for the winding 53-1 suffices.

Figure 13:
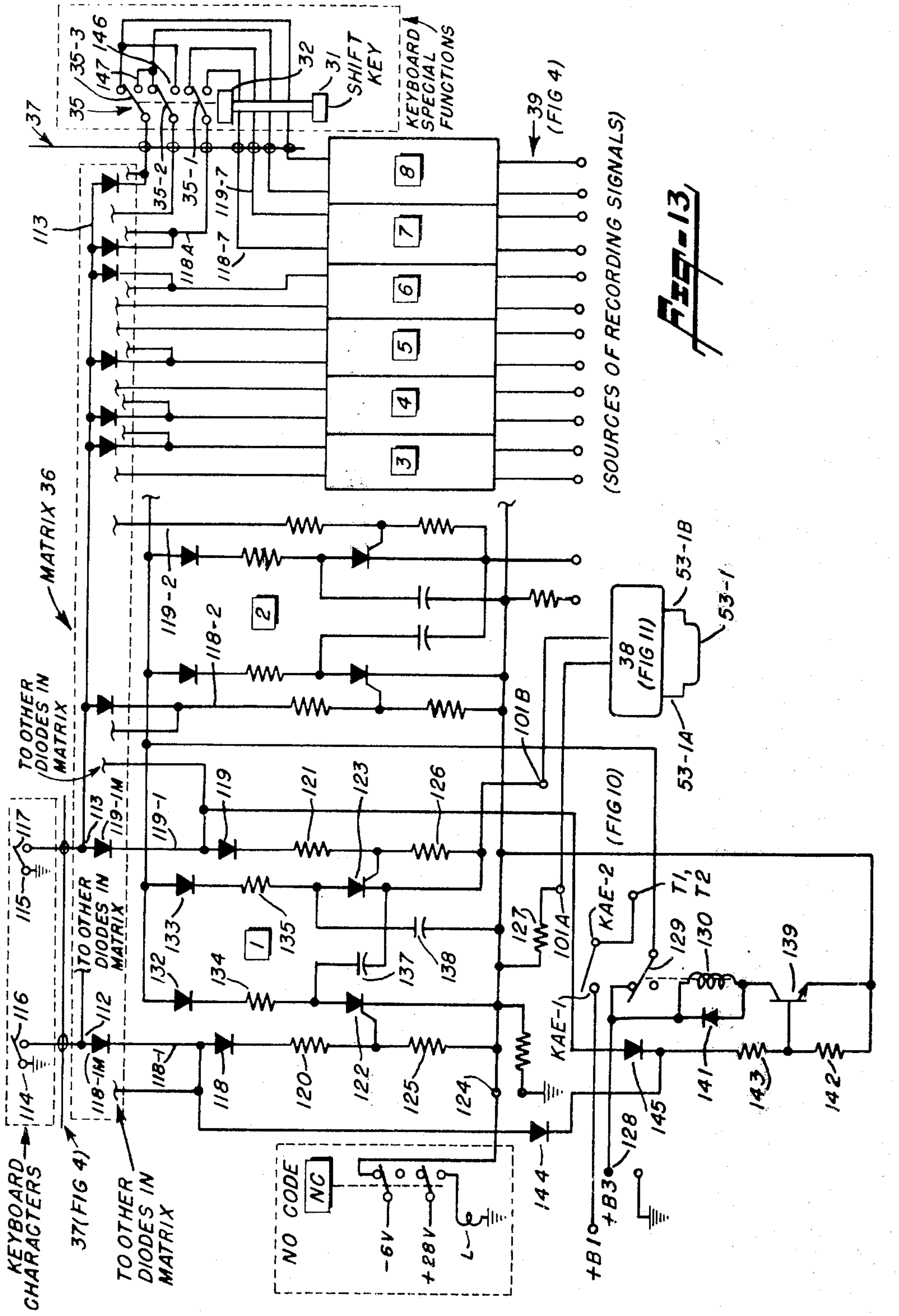
FIG. 13 is one embodiment of a circuit diagram for producing and supplying recording currents to the recording head to produce magnetic bits on the magnetizable backing.

This stage, referred to as block 1 in FIG. 13, includes a pair of input terminals 112 and 113 which are selectively connected to ground potential at terminals 114 and 115 by operation of one of the switches 116 and 117 which are respectively operatively associated with two different type bar mechanisms on the typewriter. Switches 116 and 117, which may be of the electronic type are illustrated as being mechanical switches for ease of explanation of operation, it being understood that each key on the typewriter keyboard has a single switch such as 116 or 117 associated with it. If the first bit in a character being recorded is a 1 bit, switch 117 is driven from its normally open state to a closed state upon pivoting of its associated type bar mechanism, thereby placing ground on one coordinate of the diode matrix 36. This cause the matrix to generate eight binary coded output pulses which activate different control devices in the stages 1 . . . 8 inclusive. The binary output signals of the matrix 36 are uniquely coded to represent each alphanumeric typewriter key. The stages 1 . . . 8, inclusive, thereby convert the binary output of the matrix into corresponding directionally-coded recording currents. Switch 116 remains open during closure of switch 117 since its associated key is not depressed during this type interval. Switch 117 remains closed until its associated type bar mechanism, in its return movement, travels a predetermined distance from the paper or platen whereupon the switch reopens. Thus, only one switch, such as 117 is closed at any one time.

Terminals 112 and 113 are connected through matrix didoes 118-1M and 119-1M, coupling diodes 118 and 119 as well as resistors 120 and 121, to the gate electrodes of silicon-controlled rectifiers 122 and 123, respectively. The gate electrode of silicon-controlled rectifier (SCR) 122 is connected to the reference −6 volt potential at terminal 124 through a resistor 125. The gate electrode of SCR 123 is connected to contact 101B at one side of winding 53-1 through a resistor 126. The other contact 101A formed on the other side of winding 53-1 is connected to the reference voltage at terminal 124 through 0.2 ohm resistor 127, such resistor being utilized to monitor the current through winding 53-1. Hence, when the system is in a quiescent condition and switches 116 and 117 are both open, resisors 125 and 126 apply approximately a −6 volt D.C. potential to the gate electrodes of SCRs 122 and 123, respectively, to maintain these rectifiers in a cut-off condition.

Under quiescent conditions, the anodes of silicon-controlled rectifiers 122 and 123 are connected to a +B3 volt D.C. supply at terminal 128 via the path through contact 129 of relay 130, and the parallel paths through hold-off diodes 132 and 133, which are respectively connected in series with resistors 134 and 135. The cathode of silicon-controlled rectifier 122 is connected to the −6 volt DC potential at terminal 124. Resistor 127 and winding 53-1 have an extremely small series impedance and since there is no current flowing, except a small leakage current, there is very little voltage drop, and therefore, the cathode electrode of SCR 123 is also maintained at approximately −6 volts D.C. at quiescence.

Bipolar high ampere pulses may also be fed through winding 53-1. As illustrated, the andoes of SCR's 122 and 123 are respectively connected to one electrode of each of capacitors 137 and 138. The other electrode of capacitor 137 is connected to contact 101B, resistor 126 and the anode of SCR 123 while capacitor 138 is connected directly to the −6 volt D.C. source at terminal 124. Current derived from the initial charge on capacitor 137 passes thru winding 53-1 with the current flowing from left to right, FIG. 13, in response to SCR 122 being rendered in a closed circuit condition while current flows in the opposite direction through winding 53-1 in response to current derived from capacitor 138 when the anode-cathode path of SCR 123 is closed. Current flow from left to right typically corresponds to the recording of a 0 bit whereas current flow from right to left typically corresponds to the recording of a 1 bit.

Normally closed contact arm 129 couples the positive D.C. voltage at terminal 128 to capacitors 137 and 138 during the interval when no key on the keyboard is activated. Contact arm 129 is open circuited during virtually the entire interval when a key on keyboard is depressed in response to activation of relay coil 130 whereby the current supplied by capacitors 137 and 138 to winding 53-1 is of predetermined duration. Relay coil 130 is connected in the collector circuit of NPN power transistor 139 and is shunted by reverse biased protecting diode 141. The emitter of transistor 139 is connected directly to the negative voltage at terminal 124. The base of transistor 139 is connected to the negative supply at terminal 124 through resistor 142 and is connected to terminals 112 and 113 through isolating diodes 144 and 145 and matrix diodes 118-1M and 119-1M respectively.

Under normal operating conditions, transistor 139 is maintained in a non-conducting condition by the negative voltage applied to its base through resistor 142 thereby causing the base and emitter to be at the same voltage level. With transistor 139 non-conducting, contact arm 129 is closed, whereby capacitors 137 and 138 are fully charged through components 132, 134 and 135 respectively to a potential of, for example, +35 volts. The charge is maintained on capacitors 137 and 138 under quiescent conditions because the anode-cathode paths of SCR's 122 and 123 are cut-off. In response to a depression of a key on the keyboard one of switches 116 and 117 is closed to apply a forward bias to the base of a power transistor 139. Forward biasing transistor 139 causes relay 130 bo be energized, opening contact arm 129.

The triggering of eighth SCR 122 or 124, however, occurs before the contact arm 129 opens because the response of the relay 130 is substantially slower than that of the SCR's. In response to closing one of contacts 116 or 117, the charge on one of the capacitors 137 or 138 is immediately conducted through the anode-cathode path of the SCR having its gate electrode connected to the closed switch. Capacitors $C_1$ and $C_2$ are sufficiently large, having a magnitude of 12 microfarads, and the forward impedance of SCR's 122 and 123, is low enough so that a current pulse having the required amplitude and duration is produced. Because of the extremely low impedance in the resistance-capacitance circuit connecting winding 53-1 to the selected one of capacitors 137 or 138, virtually all of the cated a fixed distance inwardly of the margins of sheet 21 to provide a positive pin feed for the paper sheet and to maintain the sheet in horizontal alignment.

Figure 4:
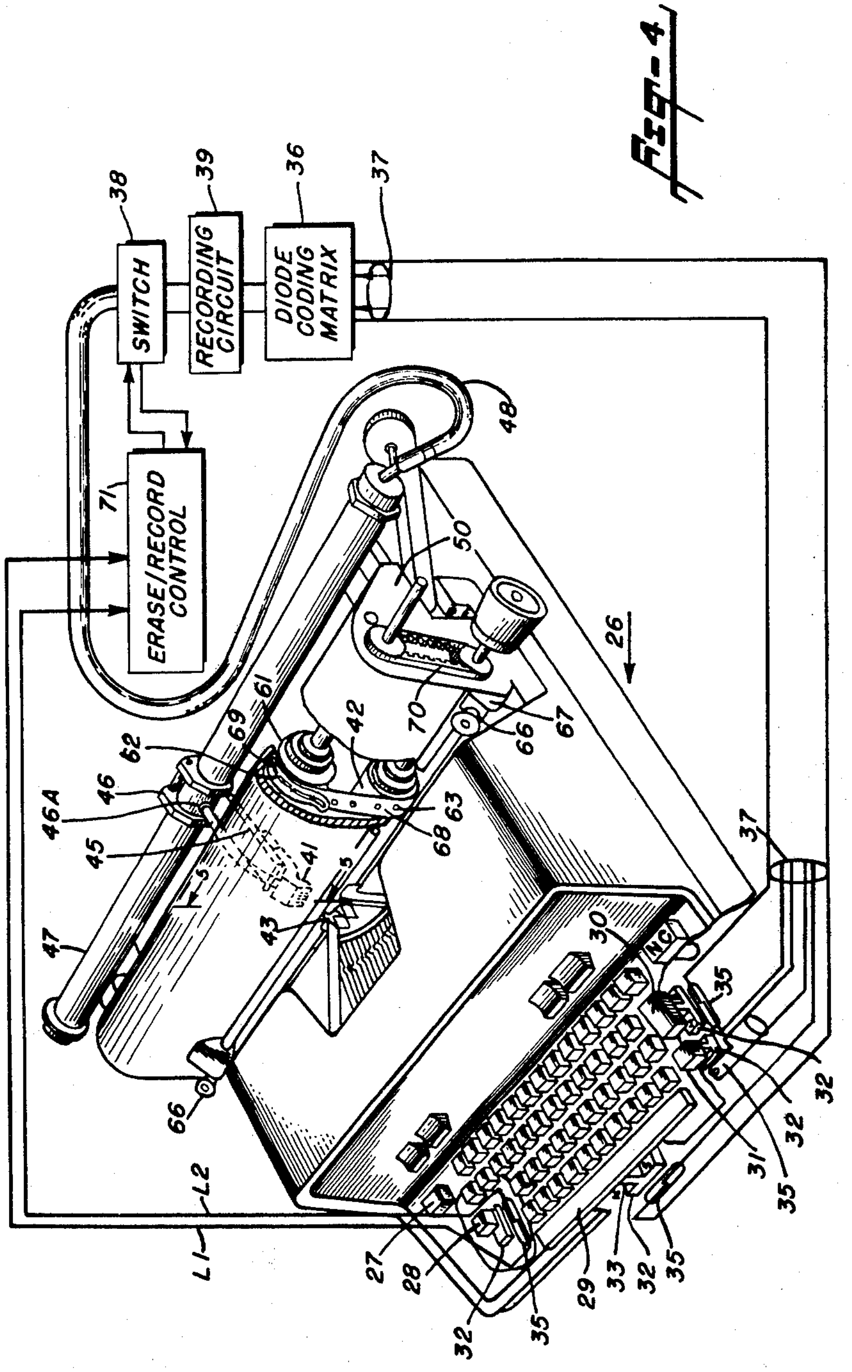
FIG. 4 is a perspective view, in combination with a circuit block diagram, of one embodiment of a typewriter-encoder constructed in accordance with the present invention.

Referring to FIGS. 4 and 5, the magnetizable backing 22 is pressed into firm contact with the conductors 53-1 . . . 53-8 by a transparent hold-down plate 64 spanning opposed columns of pins 62. Pins 65 mounted stationary on carriage assembly 50 hinge the upper right-hand end of the plate 64, as viewed in FIG. 5, for pivotal movement thereon. The lower left end of the plate 64 includes pins 66 that selectively engage bores, not shown in aubtment 67 that is also fixedly mounted to carriage assembly 50. Hold-down plate 64 has a section of enlarged width at the lower end thereof for forcing the backing 22 into good electrical contact with the conductors 53-1 . . . 53-8 of head 41.

Proper registry is maintained despite rubbing between both faces of the sheet 21 and backing 22 by the clamping action of elongated spring clips 68. Clips 68 are connected at each end of plate 64 so that a longitudinal slot 69 formed in the clips 68 accommodates the pins 62 of platen 61 as the pins rotate. The ends of clips 68, FIG. 5, remote from the hinge pin 65, are connected to the plate 64 and are configured to extend parallel to the semicircular upper portion of the plate 64 to enable the sheet 21 to issue freely from under upper platen 61. Platens 42 and 61 are rotated together in synchronism by a belt drive 70 so that pins 62 positively engage and drive the paper sheet 21 and the backing 22.

MAGENTIC RECORDING—GENERAL DESCRIPTION OF RECORDING OPERATION

Figure 12:
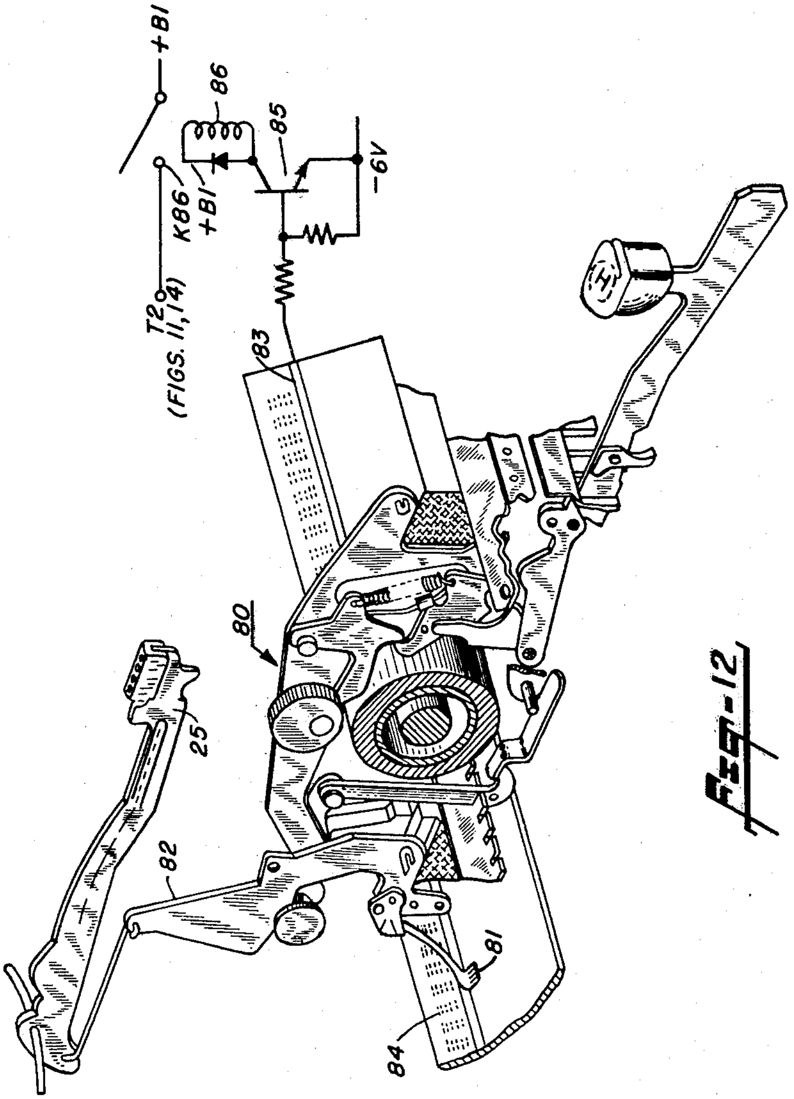
FIG. 12 illustrates a system for automatically initiating magnetic erasure of discrete magnetizable areas immediately prior to recording on such areas.

The magnetic bits are recorded on the magnetic backing 22 simultaneously as a corresponding character is typed onto the sheet 21. A typical recording is initiated by an operator depressing a selected character key on the keyboard FIG. 4 whereupon the corresponding type bar is driven by conventional means to rotate about a pivot in the usual manner. A conventional single type bar and cam drive therefor is depicted by FIG. 12 and referred to generally by the numeral 80. The wiper 81 affixed near the pivot end of the type bar sweeps past a contact 84 to close a normally open switch or switches. When the corresponding switch closes, ground potential is applied to the conductor connected to one side of the switch and included among the conductors grouped in the cable 37. In response to the grounding of this particular conductor, diode coding matrix 36 generates eight binary signals in parallel on its eight output conductors. These eight signals are fed through switch 38 to recording circuit 39, FIG. 13, and to conductors 53-1 . . . 53-8, inclusive, FIG. 6. Each of conductors 53-1 . . . 53-8 receives, by way of its associated leads and terminal connections to the block 59, a different predetermined, unique binary signal with the binary 1 signals flowing through the conductors in one direction and the binary 0 signals flowing through the conductors in an opposite direction. The contact 84, FIG. 12 may be a multiple contact device coded to perform the function of the diode coding matrix 36, FIG. 4. Switch contact 83 is used when it is desired to generate an erase signal prior to recording.

The binary 1 and 0 currents flowing in conductors 53-1 . . . 53-8, inclusive, cause magnetic fluxes of opposite directions to be generated, dependent upon the polarity of the currents applied to the respective leads and windings. For example, if it is assumed that the current pulse applied to the first two windings 53-1 and 53-2 are as indicated by the waveforms of FIG. 2, a binary 1 positive current flows through winding 53-1, whereupon a clockwise flux is induced by that winding in the region surrounding it. Simultaneously a binary 0 negative current flows through winding 53-2 whereupon a counterclockwise flux is induced in the area surrounding the winding. In response to the clockwise and counterclockwise fluxes derived from conductors 53-1 and 53-2 the surface areas of backing 22 directly in contact with these conductors are magnetized in opposite directions, typically across a 3 mil width of the backing 22. With adjacent conductors 53-1 and 53-2 sufficiently separated from each other by, for example, 10 mils, the center of the flux concentrations resulting from current flows through these conductors, are likewise separated by 10 mils. The fringing effects of the magnetic flux may spread approximately 1.5 mils to either side of the center of the winding, so that there is approximately a 7 mil gap between adjacent flux areas on the backing 22. The 7 mil spacing between the extremities of the magnetic bits recorded on the backing 22 is provided by the four spacing windings 54 interposed between adjacent recording windings 53-1 and 53-2. Because of the spacing between adjacent recorded bits, the magnetic data stored on the backing 22 may be readily read out by a conventional magnetic read head. The current pulses required to drive the record windings are typically pulses having very steep leading edges and slowly declining trailing edges. Typically the pulse having a maximum amplitude on the order of 20 amperes and drop to a value of less than 1 ampere in a time interval of approximately 100 microseconds.

The entire operation described for recording magentic bits on the backing 22 occurs in less time than the interval between activation of the type bar and release of platen 42 prior to the type bar striking it. It is important that the magnetic bits be recorded on the backing 22 with the platen 42 stationary to maintain the recorded bits in alignement.

MAGNETIC RECORDING — ALPHANUMERIC CHARACTERS

Reference is now made to FIG. 13 of the drawings wherein there is illustrated a circuit diagram of an exemplary one of the sources of recording currents illustrated in FIG. 12. Each source delivers recording pulses having waveforms as described hereinabove to a corresponding recording winding 53-1 . . . 53-8 and comprises a low impedance switch through which the charge from a previously charged capacitor is dumped into an associated recording winding. The recording mode is initiated by the operator depressing a selected one of the keys on the keyboard shown in FIG. 4 which causes the associated key type bar to pivot toward the platen. While so pivoting, the type bar mechanism closes a switch associated therewith prior to impact of the type bar with the paper or platen.

As mentioned hereinabove, eight individual recording stages or circuits are provided, with each stage being fed a properly coded signal obtained from the matrix 36 in response to a switch closure caused by pivotal movement of the type bar mechanism. In turn, each stage generates a short duration, high amplitude pulse for feeding one of windings 53-1 . . . 53-8. The disignificant current flow occurs in the winding within 30 microseconds.

Current will not flow through the winding 53-1 after capacitor 137 or 138 is discharged and the circuit from terminal 128 has been opened. Similarly, the gated SCR 122 (or 123) is cut off after the discharge of the capacitor connected to its anode because of the open circuit condition of contact arm 129 preventing any current flow through components 132, 134 or 133, 135 respectively.

As mentioned hereinabove, each of the remaining seven sources of recording currents is substantially the same as the described source except that the other circuits do not have their imput terminals 112 and 113 connected to the base of transistor 139. It is necessary that only one of the driver circuits be connected to selectively forward bias transistor 139 during the period when the selected key is depressed.

MAGNETIC RECORDING—SPECIAL FUNCTIONS: SHIFTING

The seventh and eighth stages differ slightly from the remaining stages such difference resulting from a need to reverse the polarity of the shift key and parity indicating magnetic bits when shift key 31 (FIG. 4) is depressed.

To record the operation of the shift key, the seventh source of recording currents shown in FIG. 13 is utilized. This stage includes a single lead 118A that is energized whenever any of the alphanumeric keys on the keyboard are depressed lead 118A of the seventh stage is normally coupled through a read switch contact arm 35-1 and resistor 121 to the gate electrode of SCR 123, whereby the winding 53-7 connected to the seventh stage is supplied with current from capacitor 138 in response to each key activation. When current is received from capacitor 138 it represents the recording of a 1 bit. If the shift key 31 is depressed to make a shift from the lower to the upper case, the arm 35-1 changes state resulting from magnetization by the permanent magnet 32 moving sufficiently close to reed switch 35.

During each shift period lead 118A is connected through closed contact arm 53-1 and resistor 120 to the gate electrode of SCR 122 of the seventh stage. Energization of the gate electrode of SCR 122 results causing capacitor 137 to discharge current through the winding 53-7 in the opposite direction, thereby representing the recording of a 0 bit. Therefore, the direction in which the winding 53-7 of the recording head is selectively energized with bipolar currents indicating the status of shift key 31 is accomplished without resorting to complex circuitry. Typically, a recorded 1 bit represents lower case and a recorded 0 bit represents the upper case.

MAGNETIC RECORDING—SPECIAL FUNCTIONS: PARITY CHECK

To provide reversal of the parity bit derived from the eighth output lead of matrix 36, reed switch contact arms 35-2 and 35-3 are driven from the position shown to make with contact terminals 146 and 147 in response to depression of shift key 31. The arms 35-2 and 35-3 are similarly operated by the permanent magnet 32 attached to the lower end of the stem joined to shift key 31. The arms 35-2 and 35-3 are normally closed so that they are respectively connected through resistors 120 and 121 to the gate electrode of SCR's 122 and 123 of the eighth stage. In response to activation of shift key 31, the positions of switch arms 35-2 and 35-3 are translated to make with contacts 146 and 147 which are connected respectively through resistors 121 and 122 to the gate electrodes of SCR's 123 and 122. Thus, the parity bit indicating signal, generated by stage 8, is reversed whenever the shift key 31 is depressed. Consequently, parity is maintained by the shift key control of both the seventh and eighth recording stages.

MAGNETIC RECORDING—SPECIAL FUNCTIONS: SPACING, CARRIAGE RETURN AND TABULATING

Depression of a keyboard representinng any other special functions other than erasing, such as forward spacing, carriage return or tabulating causes closure of an associated reed switch contact and generation of a unique, corresponding code by the matrix 36 in a manner similar to that described hereinabove for alphanumeric character recording. That is, the code generated by the matrix 36 is recorded on the backing 22 and utilized subsequently in readout. The back space function, however, is not encoded on the backing 22.

In order to selectively inhibit an encoding operation, inhibit or no-code key, designated NC in FIG. 4, is provided on the typewriter keyboard and, when depressed, operates in conjunction with circuitry illustrated by FIG. 13 to inhibit the generation of recording signals. Preferably, the key NC is translucent and includes a lamp L which is illuminated by a +28 volt source when the key is depressed. Moreover, the key NC preferably includes a conventional latch mechanism (not shown) which latches up and keeps the NC circuit at essentially ground potential until the key is again depressed, thereby eliminating any requirement that the operator hold the key depressed during the no-coding interval. The no-code key is typically utilized to permit complete freedom of carriage movement by operation of the spacing key without causing the encoding of a spacing function on the backing 22 each time the spacer key is depressed.

As will be evident, provisions may also be made for the performance of other special functions; the above examples being principally illustrative of the recording capabilities of the instant invention.

Figure 9:
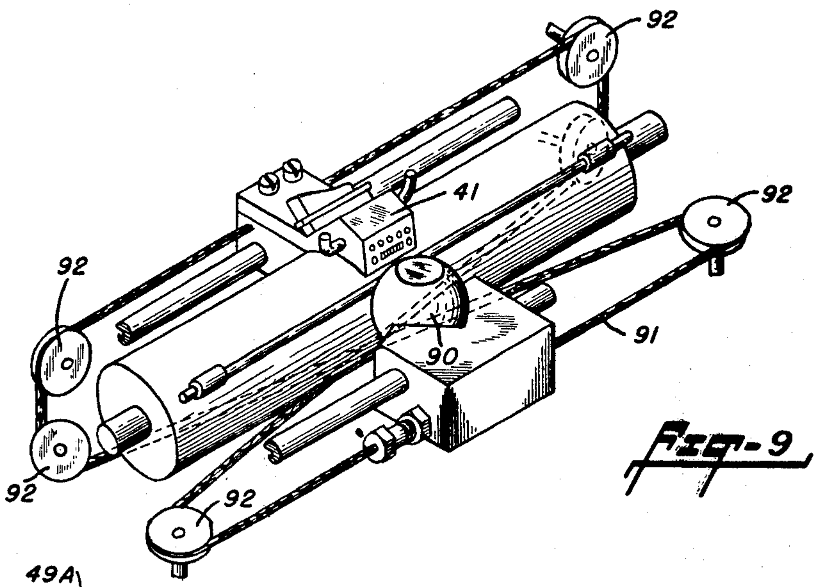
FIG. 9 is a perspective view illustrating a magnetic recording head of the type illustrated by FIG. 7 utilized in conjunction with a conventional typewriter having a ball-type printing element.

FIG. 9 illustrates another embodiment of a recording system wherein a conventional, rotatable ball-type printing head 90 is mechanically coupled to the magnetic recording head 41 through a cable 91. The coupling is by means of a system of freely rotatably pulleys 92 and is such that the head 41 remains directly opposite the head 90 in all positions of the head 90.

In certain conventional typewriters which utilize ball or cylindrical printing heads to type characters onto paper mediums, the logic utilized to effect the requisite incremental angular displacements of the head 90, whereby the selected character is rotated opposite the paper immediately prior to the imprinting thereof, typically provides representative coding which may then be supplied directly to the diode matrix 36 for initiating operation of the aforedescribed encoding circuitry associated with the head 41. Thus, in such systems the problem of generating binary voltage pulses representing the selected key on the keyboard is significantly reduced.

EMBODIMENTS OF THE MAGNETIC RECORDING CIRCUITS

There are two possible embodiments of the recording circuits for the head illustrated by FIG. 6. One embodiment is depicted by FIG. 13 wherein the recording currents are supplied directly and continuously, that is, without any means of interruption, to recording windings 53-1 . . . 53-8. Thus, for winding 53-1, terminals 101A and 101B are continuously connected to leads 53-1A and 53-1B, respectively. In this embodiment, the windings 54, FIG. 6, in section B' serve solely as spacers for the recording windings and the leads 50A and 50B may be opened circuited or otherwise precluded from receiving current.

Figure 11:
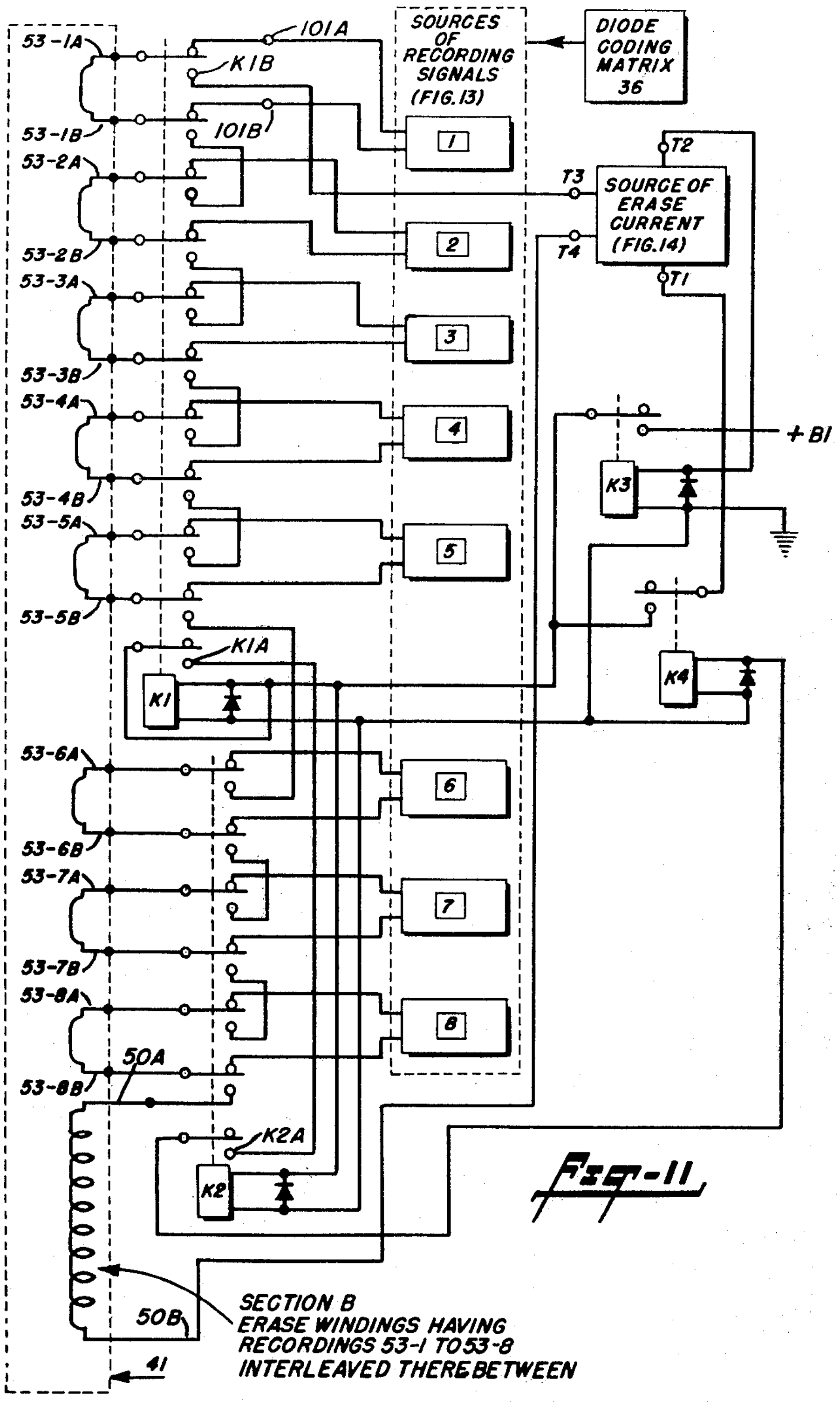
FIG. 11 illustrates a system for supplying recording current to the recording head and for manually initiating magnetic erasure of discrete magnetizable areas immediately prior to recording on such areas.

A second embodiment is depicted by FIG. 11 wherein the recording currents, FIG. 13, are supplied by way of interruptable circuits to the lead-ins of the recording windings. In this embodiment, the spacer and record windings in section B may also serve as erase windings. The means by which the former windings are made to serve during an erase mode is described hereinbelow.

MAGNETIC ERASE

Figure 14:
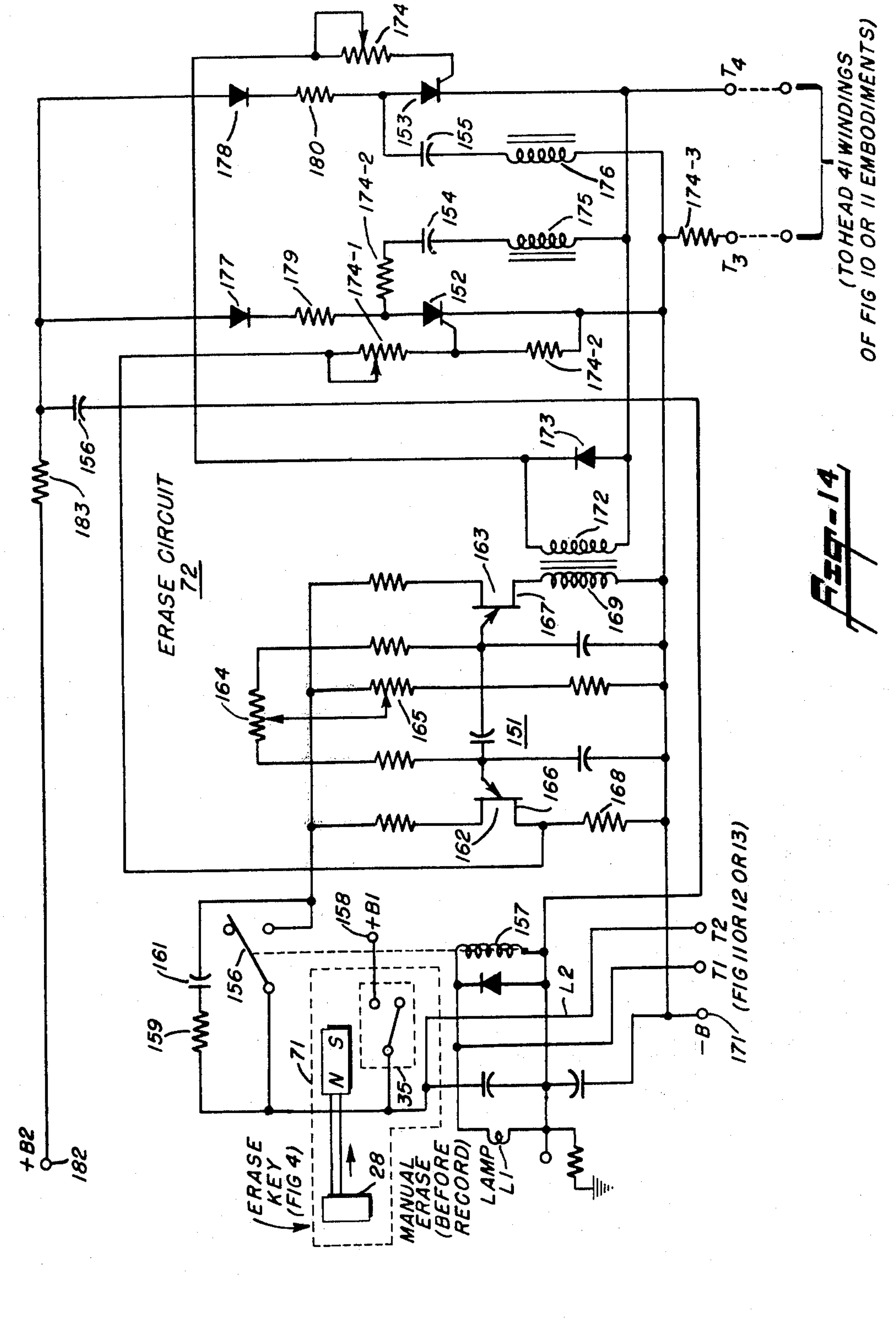
FIG. 14 is a schematic diagram of a source of erase currents for the systems of FIG. 10–12, inclusive.

Apparatus is provided for erasing the bits associated with a character when the operator realizes that a mistake has been made. When this occurs the operator backspaces carriage assembly 50 of FIG. 4 by depressing the standard backspace key 27 until the character that needs correcting is centered between the spaced-apart vertical guide bars of the type guide 43. After the character in error and type type guide 43 are aligned, the operator depresses error correction erase key 28 which causes a permanent magnetic mounted on the key extension to sweep past and close the associated reed switch in the process as indicated in FIG. 14.

Generally summarized, in response to the closure of this switch, erase control 71 derives a signal that is applied to energize relays shown in FIG. 11, and then erase circuit 72. The signal applied by erase control terminal T2, energizes relays to connect in electrical series the terminals joined to the leads 50A and 50B and the terminals joined to the recording windings 53-1 . . . 53-8, inclusive, thereby connecting all windings in section B in electrical series. Thus, current supplied to a winding in section B flows in the same direction through all other windings in that section and hence any current applied from terminal T3, to relay contact K1B flows the entire width of a character space on the backing 22.

After relays K1 and K2 have been energized so that all of the windings in section B are connected together in series, erase circuit 72 responds to the energizing of relay 157 to generate a plurality of short duty cycle current pulses having a waveform similar to a damped sinusoid with a duration on the order of 100 milliseconds. The current supplied by erase circuit 72 to switch 38 has a peak magnitude of approximately 20 amperes and a duty cycle on the order of 0.1 to prevent overloading of windings 53-1 . . . 53-8. Because of the damped sinusoid waveform of the pulses applied by erase circuit 72 through contacts of relays K1 and K2 to the series-connected windings in Section B, the magnetic flux is removed by degaussing from the area where the character desired to be erased is located and the magnetic flux is removed throughout the entire area of the character sought to be erased because the windings in section B are all connected series-aiding. Hence, if the printed character and the magnetic data associated with it are not perfectly aligned with type guide 43, the magnetic bits representing the character are nevertheless erased.

Figure 10:
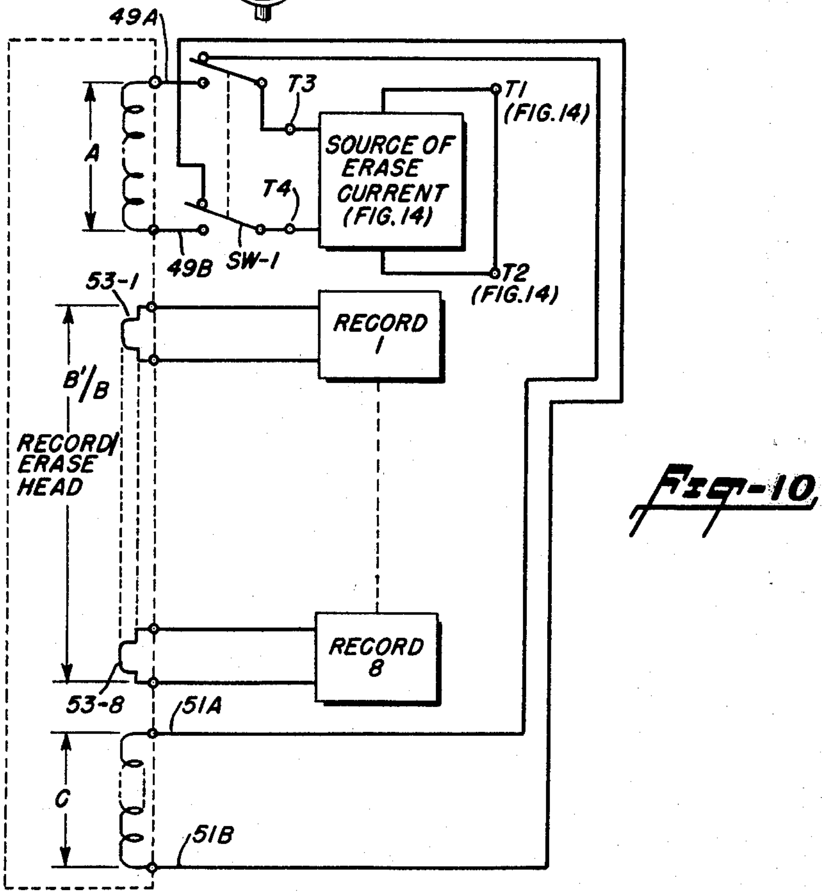
FIG. 10 illustrates a system for magnetically erasing discrete areas immediately preceding or following a discrete area on which a magnetic recording is to be made.

Magnetic erasures may be made on either side of a character centered between the spaced, vertical bars of the type guide 43, FIG. 4. As illustrated by the embodiment of FIG. 10, this is accomplished by connecting terminals T3 and T4 of a source of erase currents, FIG. 14, either to the lead pair 49A, 49B or to the lead pair 51A, 51B. The selective connection of the terminals T3 and T4 to either lead pair may be effected by manual operation of a double throw-double pole switch SW-1. In this mode, the terminals T1 and T2 of FIG. 14 are only connected as indicated by FIG. 10. The circuit arrangement illustrated by FIG. 10 thereby provides one with a choice or erase modes, that is, erasure either to the right or to the left of each recorded character. The actual erasure (by degaussing) may occur when the keyboard erase key 28, FIG. 14, is depressed or automatically upon activation of each type bar mechanism. The latter can be accomplished by providing an extra set of contacts KAE-1 and KAE-2 on the relay 130, FIG. 13, and having these contacts connected in parallel with the contacts of switch 35, FIG. 14 with T1 connected to T2 as indicated in FIG. 10.

Magnetic erasures may also be made immediately before and in the area where a new character is to be encoded. Additional modes of erasure may be accomplished manually by depressing the keyboard erase key 28, FIG. 14, and/or automatically by utilizing the movement of the type bar mechanism. The respective circuits utilized to implement manual and/or automatic erasure of the area on the backing 22 corresponding to the portion of the recording medium centered between the bars of the type guide 43 is illustrated by FIGS. 11 and 14 considered in conjunction with each other and be FIGS. 11, 12 and 14, similarly considered.

Briefly summarized, the manual erasure mode contemplates depression of keyboard erase key 28, FIG. 14, which then initiates the application of erase current to the area on the backing 22 prior to recording on essentially that same area and therefore is used mainly to make corrections of previously recorded data. The automatic mode contemplates initiating the application of the erase current to the specified area on the backing 22 upon normal operation of the keybar mechanism. Since both modes require an appropriate source of erase current, a suitable source according to this invention is disclosed hereinbelow.

EMBODIMENT OF ERASE CURRENT SOURCE

FIG. 14 illustrates a detailed schematic diagram of a circuit 72 for generating erase currents. Basically, circuit 72 produces a succession of relatively low-duty cycle, bipolarity pulses, the amplitudes of which decrease with each succeeding pulse. The first pulse produced has a peak current of 20 amperes and the succeeding pulses decrease in amplitude by approximately 10 per cent, whereby the pulses have an envelope approximating a damped sinusoid. Each pulse has a maximum duration on the order of 100 microseconds with a duty cycle of approximately 10 per cent, whereby the pulse amplitude reaches a virtually negligible value of about 1 milliampere within 100 microseconds after the first pulse is initiated.

By creating pulses having initial amplitudes equal to the amplitude of the recording pulses and successively reduced amplitude levels to the head windings comprising series-connected windings 53-1 . . . 53-8, and series-connected erase winding from 50A to 50B, the flux level of the magnetic data in the area on backing 22 is finally reduced to a level less than one which can be detected or read with read out circuitry and particularly the read out circuitry disclosed subsequently. The successively decreasing amplitude erase pulses thru windings 53-1 . . . 53-8 and series-connected erase winding 50A and 50B causes the area on backing 22 to have reduced magnetism because the medium is successively driven through smaller and smaller B-H curves, in a manner well known to those in the magnetic recording art.

The circuit 72 comprises a conventional free-running multivibrator 151 for alternately triggering the gate electrodes of SCR's 152 and 153. SCR's 152 and 153 alternately feed bipolarity current pulses from capacitors 154 and 155, respectively to series-connected windings of the head 41. The current pulses fed by SCR's 152 and 153 to the head windings decrease in amplitude because the anode-cathode voltage applied across the SCR's is reduced each time an SCR is triggered. Reduction of the anode-cathode voltage or each SCR is accomplished, generally, by connecting the anode-cathode circuit paths across a capacitor 156 which is connected in a relatively long time-constant circuit.

Resistor 174-2 has a value of 0 to several ohms, depending on the value of capacitors 154, 155. To enable the first positive erase pulse to be greater than the amplitude of the first negative erase pulse, capacitor 155 has a larger value of capacitance than capacitor 154 or alternatively, if capacitor 154 and 155 are of the same value then resistor 174-2 is used to decrease the amplitude of the negative erase pulse.

To trigger the normally inoperative multivibrator 151 into operation, a D.C. energizing potential for the multivibrator is applied thereto by closure of normally-open contact 156 of a relay 157. A relay with mercury wetted contacts is used for the relay 157 to prevent contact bounce or chatter. The coil of relay 157 is selectively energized through its connection of T1 and T2 to the circuit shown in FIG. 11. As mentioned above, a switch 35 is selectively closed in response to movement of magnet 32 that is attached to an extension of erase key 28. Hence, in response to depression of erase key 28, a circuit is completed to energize the coil of relay 157 from the positive voltage source +B1 to ground, to energize the relay coil and close contact arm 156. To provide contact protection of the contact arm 156, the arm is shunted by the series combination of resistor 159 and cap acitor 161.

In response to the application of +B1 to multivibrator 151, the multivibrator commences constant frequency oscillation. The multivibrator comprises a pair of unijunction transistors 162 and 163 that are connected in a conventional oscillating circuit that need not be specifically described. The oscillating circuit includes potentiometers 164 and 165 that are respectively connected thru resistors to the emitters of unijunctions 162 and 163. The sliders of potentiometers 164 and 165 are adjusted so that unijunction 163 always commences conducting prior to unijunction 162. The values of the resistors and capacitors connected to the emitters of unijunctions 162 and 163 are selected so that a pulse is derived from each of the unijunctions once approximately every 300 microseconds.

Bases 166 and 167 of unijunctions 162 and 163 are respectively connected through load resistor 168 and winding 169 to terminal 171 at a potential of, for example, −6 volt. The voltages developed across resistor 168 and inductance 169 are respectively applied to the gate electrodes of SCR's 152 and 153, whereby each of the SCR's is triggered into conductive state as unijunctions 162 and 163 are rendered conductive. In response to SCR's 152 and 153 conducting, the charge accumulated on capacitors 154 and 155, respectively, is discharged in opposite directions through series-connected windings in the head 41.

The voltage induced in winding 169 in response to conduction of unijunction 163 is coupled to secondary winding 172, that is shunted by oscillation-damping diode 173. One end of winding 172 is connected to the cathode of SCR 153 while the other end of the winding is connected through limiting resistor 174 to the SCR gate electrode. The voltage developed across resistor 168 in response to conduction of unijunction 162 is coupled to the gate electrode of SCR 152 via the current limiting voltage divider comprising resistors 174-1 and 174-2.

Connected in series with capacitors 154 and 155 are relatively high Q coils 175 and 176, respectively. One end of coil 175 is connected to terminal T4 while one end of coil 176 is connected to a slightly negative voltage −B of, for example, −6 volts at terminal 171 and through resistance 174-3 to the terminal T3. Coils 175 and 176, together with capacitors 154 and 155, respectively, form low impedance series resonant circuits which have a half cycle oscillation period on the order of 100 microseconds to reduce the anode voltage for SCR's 152 and 153. The SCR's are cut off in response to the oscillating voltage derived from the series resonant circuit subsequently to their activation in response to an output from oscillator 151.

The anode-cathode paths of SCR's 152 and 153 are energized through isolating diodes 177 and 178, which are series-connected respectively to current limiting resistors 179 and 180. Power to diodes 177 and 178 and the anodes of SCR's 152 and 153 is derived from an approximately +130 volt supply connected to terminal 182 through resistor 183 that has a relatively large value, on the order of 5,000 ohms. Resistor 183, together with capacitor 156, forms a relatively long-time constant circuit.

In operation under quiescent conditions, capacitors 154 and 155 are charged to approximately the voltage between terminals 182 and 171, while capacitor 156 is charged to the slightly lower voltage between terminal 182 and ground. Under quiescent conditions, no voltage is applied to unijunctions 162 and 163, whereby multivibrator 151 is not operating.

In response to depression of key 28, contact 156 is closed, so that multivibrator 151 commences operation. Unijunction 163 invariably is triggered into a conducting stage prior to unijunction diode 162 because of the positions for the sliders of potentiometers 164 and 165, whereby a current is fed to winding 169. In response to current being fed through winding 169, a voltage is induced in secondary 172 and coupled to the gate electrode of SCR 153.

The voltage applied to the gate of SCR 153, drives the SCR anode-cathode to its low impedance state and the charge stored on capacitor 155 is applied to terminal T4 and is discharged thru windings 53-1 . . . 53-8 and series connected erase windings from 50A to 50B. The current derived from capacitor 155 has a tendency to oscillate because of its series connection with inductance 176. When the oscillating current reaches zero value, within 10 microseconds of the gate for SCR 153 being activated, the anode-cathode path of SCR 153 is cut off.

Capacitor 156 now supplies additional charge to capacitor 155, charging the latter capacitor to a voltage approximately 20 percent less than the voltage to which it was previously charged. The reduced voltage occurs because the capacitor 156 voltage decreases as it transfers charge to capacitor 155. In response to the charge transfer from capacitor 156 to capacitor 155, the voltage across the former capacitor is reduced. Even through capacitor 156 is connected to a positive supply at terminal 182, it cannot be recharged to its former value prior to the next pulse from multivibrator 151 because of the relatively large (30 millisecond) time constant of the circuit in which it is connected.

While current is being supplied by capacitor 155 to the head windings, the resistance-capacitance time constant circuits of multivibrator 151 are discharging and recharging, whereby within 100 microseconds after SCR 153 is originally gated into conduction, unijunction 162 is rendered in a conducting condition. In response to unijunction 162 conducting, the gate electrode of SCR 152 is energized, establishing a low impedance path from capacitor 154 through terminal T3 and the head windings. The current from capacitor 154 to the head windings flows in a direction opposite to that from capacitor 155, whereby a second current pulse, of opposite directioon to the first pulse, is supplied through windings 53-1 . . . 53-8 and series-connected erase windings from 50A to 50B. The second current pulse has a lower amplitude than the first because capacitor 154 has a lower capacity than capacitor 155 or alternately due to resistor 174-2.

The resonant circuit comprising capacitor 154 and inductor 175 is arranged so that a 10 microsecond pulse is delivered to the head windings, i.e. the second pulse has the same duration as the first pulse supplied to the windings by capacitor 155. Thereby, the anode-cathode path of SCR 152 is rendered in a nonconducting state after one-half cycle of the high frequency current applied to it.

After the charge on capacitor 154 has been discharged in the recording windings and SCR 152 has cut off, capacitor 154 is supplied with additional charge by capacitor 156. The charge transferred from capacitor 156 to capacitor 154 is reduced over the charge formerly maintained across the capacitor, whereby the current delivered to the windings by capacitor 154 and SCR 152 in response to the next activation of unijunction 162 and multivibrator 151 has a peak value less than the current supplied by the capacitor the first time the SCR was activated. The decrease in current supplied by capacitors 154 and 155 is approximately 10 percent during each cycle, whereby the peak amplitude of the current fed by capacitor 155 to the head windings the first time that SCR 153 is activated is on the order of 20 amperes while the peak current supplied by the capacitor to the windings the second time the SCR 153 is triggered is approximately 16.2 amperes. Similarly, the initial peak current supplied by capacitor 154 to the windings is on the order of 18.0 amperes while the second current pulse fed to the windings by capacitor 154 has a magnitude of approximately 14.6 amperes.

Capacitors 154 and 155 are alternately discharged to generate approximately 10 cycles of positive and negative decreasing amplitude pulses over an interval of appproximately 6 milliseconds. After about three milliseconds the amplitude of the pulses has decreased to nearly zero and the erasing mode may be terminated by releasing the erase key 28. When this occurs, the associated reed switch 35 opens, contact 156 opens and voltage is removed from multivibrator 151.

SYSTEM FOR MANUALLY ERASING AREA PRIOR TO RECORDING THEREON

The erase currents flowing through the terminals T3 and T4, FIG. 11, are selectively applied to the windings of section B by manual initiation of the circuitry illustrated by FIG. 11. Following depression of the erase key 28 and consequent closure of its associated switch 35, FIG. 14, current from a +B1 source flows through terminal T2 to relay K3, FIG. 11.

Two relays K1 and K2 are utilized typically because of the large number of contacts involved. As an examination of the circuit will bear out, relay K4 cannot be energized until both relays K1 and K2 have pulled in because a set of contracts K1A and K2A from each relay are connected in series with the relay K4 energizing circuit. Relay K4 is energized upon closure of contacts K1A and K2A and the time it takes to pull in provides additional delay to insure that all contact bounce attributable to the pulling in of relays K1 and K2 is over before +B1 is coupled through relay K4 contacts out to mercury relay 157 of FIG. 14. As disclosed above, the circuit of FIG. 14 insures that the lamp located on typewriter which illuminates the erase key 28 lights when erasing. There is no arcing or increase in contact resistance of the contacts of FIG. 11 utilized in switching the windings of section B since these relay contacts are closed prior to initiating the generation of the erasing current. The diodes across the relay coils of the relays K1 . . . K4 are for relay contact protection to prevent arcing.

Upon release of the erase key 28 current is removed from the relay K3 causing this realy and the relays K1, K2 and K4 to drop out and restore the contacts controlled by the relays K1 and K2 to the positions shown in FIG. 11. The windings in section B are then conditioned to receive recording signals from the sources 1–8, inclusive. The recording signals are produced in the manner and by the means described above.

SYSTEM FOR AUTOMATICALLY ERASING AREA PRIOR TO RECORDING THEREON

FIG. 12 illustrates a conventional electric typewriter mechanism designated generally by the numeral 80. the mechanism includes a flexible electrical wiper 81 mounted on type bar mechanism 82 so as to wipe firstly across a common electrically conductive strip 83 and then across an insulated spacing and hence across a discrete conductive spot or area 84 which is associated with a particular character. A lead connects each area 84 to eight diodes of the diode matrix 36. Ground is applied to the lead when contact is made between the wiper and the area 84. Ground potential traces through the wiper 81 by way of the type bar mechanism 82 and the grounded typewriter frame. The wiper 81, in wiping across areas 84, may be considered operationally equivalent to the closing of switch 116 or 117, FIG. 13, to effect encoding.

When the wiper 81, FIG. 12 sweeps across the strip 83, ground potential is applied to a resistor coupled to the base of transistor 85 causing transistor 85 to turn on and apply energizing current to the relay 86. In response to this current, the relay 86 pulls in, closes contact K86 and thereby applies voltage +B1 to the terminal T2, FIG. 11. The application of voltage +B1 to terminal T2 of FIG. 14 causes voltage +B1 to appear at contact arm 156, in the absence of the presence or operation of the switch 35 and the keyboard erase key 28. As discussed hereinabove, energization of the relay coils occur in the sequence, first K3, then K1 and K2, K4 and lastly 157. Energizing 157 causes voltage to be applied thru contact arm 156 to multivibrator 151 causing the erase circuit to supply erase currents to all windings thereby effecting erasure of the magnetizable area prior to recording in that area constituting section B of the recording head 41. The relatively slow sweep of the wiper 81, FIG. 12, across the common strip 83 and the relatively large spacing between this strip and adjacent area 84 permits the erase operation to be completed before a recording is initiated by the wiper 81 contacting and sweeping across an aligned area 84.

It will be evident that the manual and automatic erase modes may be used together, with the manual erase, utilized selectively in instances where no recording on the same magnetizable area is desired after typing erasure is performed.

Having now described the embodiments by which data is permanently recorded on the mediums 21 and 22, a reading system will now be discussed for translating at will the magnetic data stored on the backing 22 back into groupings of electrical pulses corresponding to each particular character of the stored data.

READING SYSTEM

Figure 3:
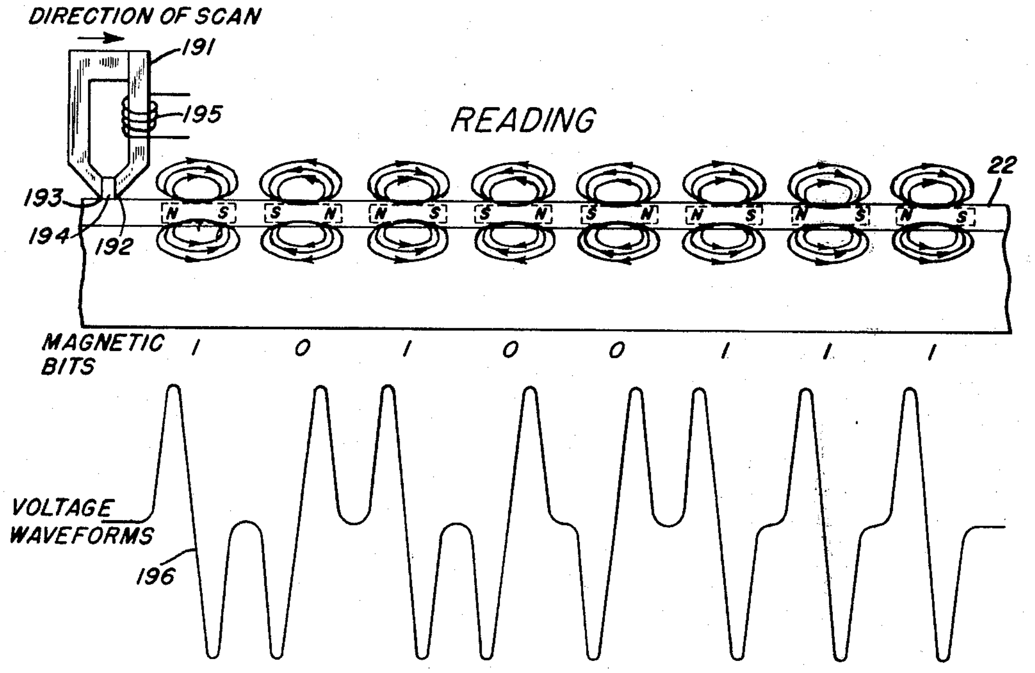
FIG. 3 is a cross-sectional view of the composite paper sheet and magnetizable backing taken along the direction of recording and additionally depicts voltage waveforms derived when the flux patterns from the backing are read.
Figure 15:
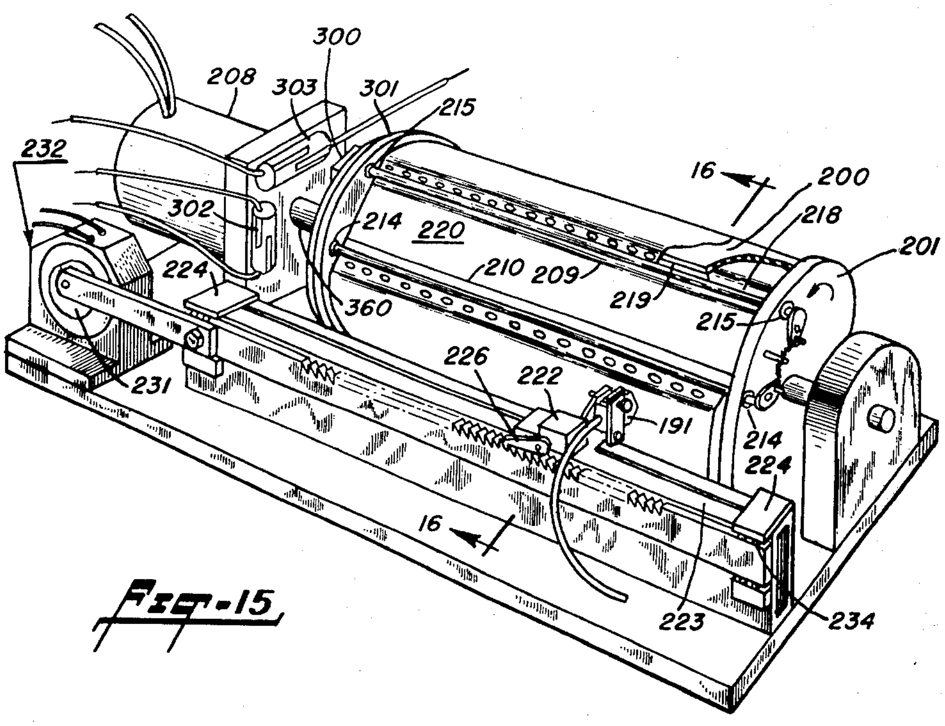
FIG. 15 is a perspective view of one embodiment of a reading apparatus constructed in accordance with the present invention.

Reference is now made to FIGS. 3 and 15 for a consideration of the techniques involved in reading the bits recorded on single lines of backing 22. In FIG. 3, the magnetic bits along a line of backing 22 are arranged so that they are derived in response to binary bits indicative of 1, 0, 1, 0, 0, 1, 1, 1, and the magnetic areas along backing 22 are polarized, respectively, in accordance with said bits as north-south, south-north, north-south, south-north, south-north, north-south, north-south, north-south. In response to the north-sought magnetic polarization, lines of flux extend from backing 22 in a clockwise direction, while the south-north magnetic areas have fluxes in the opposite, counterclockwise direction.

To read the magnetic spots along a line of backing 22, a conventional magnetic recording or read-out head 191 is provided. Head 191 includes a pair of pole faces 192 and 193 positioned to be in engagement with backing 22 and separated from each other by air gap 194. Reading head 191 is translated along a line of binary magnetic coded data on backing 22 from left to right, as viewed in FIGS. 3 and 15. Head 191 carries winding 195, that is wound about the legs of the head, and derives an output voltage commensurate with the rate of change of flux in the reading head.

As head 191 scans from left to right across backing 22, voltages indicative of flux rate of change are induced in winding 195, as indicated by waveform 196. The vertical segments of waveform 195 are aligned with the flux patterns derived from backing 22 as the head is translated. Hence, when head 191 is positioned to the left of the four magnetic bits in layer 22, FIG. 3, there is no voltage induced in winding 195. As head 191 translates to the right, the north pole of the first bit is encountered, causing a clockwise circulation of flux from pole face 192 to pole face 193. In response to the clockwise circulation of flux between pole faces 192 and 193, there is induced in winding 195 a positive voltage. When head 191 reaches the center of the first bit that is recorded, there is no rate of change of flux, whereby zero output voltage is derived from winding 195. As head 191 progresses farther to the right, beyond the center of the first bit, the rate of change of flux across gap 194 is decreasing, whereby a negative output voltage is derived from winding 195.

After head 191 has cleared the flux pattern occurring as a result of the first 0 bit recorded on backing 22, there is a gap where no magnetic flux is recorded on the backing. In response to a lack of flux in the gap between the first and second bits, a zero voltage is derived from winding 195. The zero voltage between these bits has a duration considerably in excess of the zero voltage between the poles of the first bit because of the substantial separation between adjacent magnetic bits. As a consequence, detection problems encountered with the instant record are reduced as compared to records that have bits with very small separations.

Further translation of head 191 to the right, FIG. 3, results in passage of the leftmost portion of the next bit on sheet 22 within gap 194 of head 191. Because the flux at the leading edge of the binary bit is counterclockwise, the rate of change of flux from pole face 192 to pole face 193 through head 191 is in the counterclockwise direction, whereby a negative voltage is induced in pick-up winding 195. As head 191 progresses to the center of the first binary 1 bit, a zero rate of change of flux is again circulated in 194, whereby a zero voltage is produced by the winding 195. As head 191 translates to the right side of the binary bit, a positive voltage is induced in winding 195. In the manner described, the voltage waveform 196 is sequentially derived from the winding 195 as the head 191 translates from left to right past the recorded bits to produce the voltage waveform of the eight dipulses indicative of the eight recorded bits as shown in FIG. 3. The eight bits, 10100111 are indicative of one visual character such as a lower case *a.*

Utilizing well-known magnetic recording read-out techniques for binary information, only every other peak voltage generated by winding 195 is utilized for sensing binary data. For example, if the leading edge of the voltage generated in response to each passage of head 191 over a magnetic north-south or south-north section on backing 22 is considered as possessing the binary data, the first positive peak in waveform 196, below the north pole of the first bit on backing 22, is read to provide a binary 1 indication of the first bit encountered by head 191. As the head progresses, the first negative peak voltage is discarded but the second negative peak voltage, commensurate with the south pole of the first 0 bit is read to provide an indication of the binary 0 value of the magnetic recorded data. The remaining bits are read-out in similar fashion. No clock track is required to perform the read-out since the read-out system is "self-clocking".

As seen from FIG. 3, the magnetic data recorded on the backing 22 has a length along the longitudinal axis of the sheet considerably in excess of pole faces 192 and 193 and gap 194 between them. By forming the magnetic data as lines having a length considerably in excess of the effective reading area of head 191, any problems of vertical alignment of sheet 21 when it is placed in recording typewriter 26 or on a reader are obviated. Thus, if paper sheet 21 is not straight in typewriter 26, the recorded magnetic data has a tendency to move in a transverse direction relative to head 191 during the read-out process. If head 191 had a reading area commensurate with the length of each recorded magnetic bit 23, the reader would very likely pick up magnetic bits from an adjacent line to provide a possible erroneous indication of the bits in the line being scanned. It is understood, of course, that the relationship between the reading area of head 191 and the length of magnetic bits 23 can be reversed, whereby the recorded bits have a relatively short length in the middle of each line and the effective reading area of head 191 is approximately equal to the line spacing of recorded visual character.

Figures 16, 17:
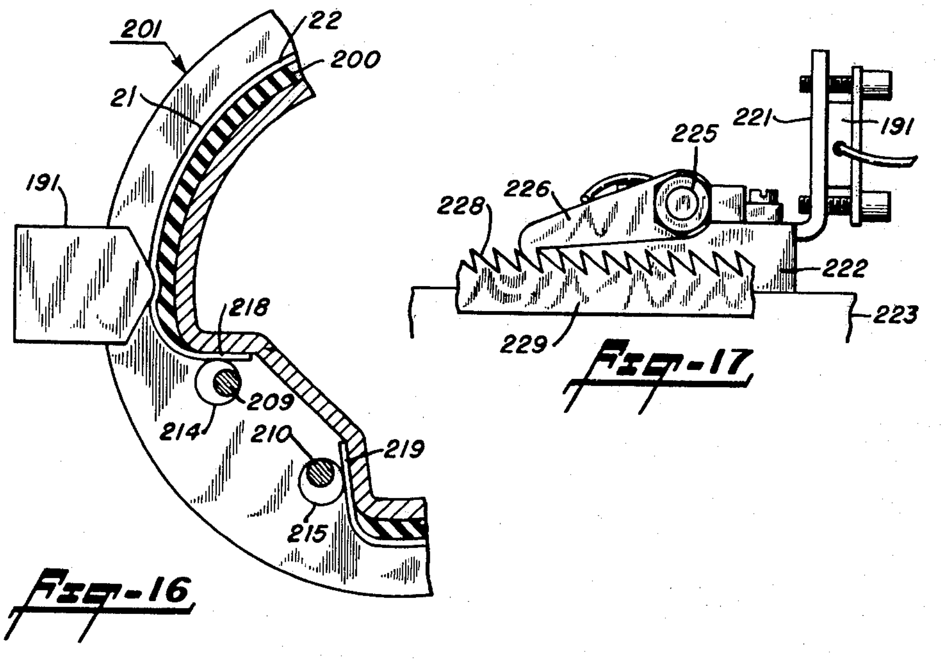
FIG. 16 is a sectional view taken along lines 16—16 of FIG. 15, illustrating the apparatus for maintaining a sheet in situ on the read head of FIG. 15.
FIG. 17 is an enlarged view of mechanism for indexing the read head from line-to-line in the embodiment of FIG. 15.

A preferred embodiment of the apparatus utilized for reading characters from backing 22 utilizing head 191 is illustrated in FIGS. 15, 16 and 17. In this figure, read head 191 detects each of the binary bits for all the characters on a particular line. Head 191 scans each line and reads a number of times equal to the number of characters recorded on the particular line. After all of the characters on a particular line have been read, the reader is advanced to the next line by moving it longitudinally relative to the length of backing sheet 22.

The reader of FIG. 15 comprises a drum 201 mounted for rotation at both ends in the direction indicated by the arrow at a relatively constant velocity of, for example, 125 inches per second. A synchronous motor 208 drives the drum and all mechanism mounted thereon. A constant speed motor 208 is not essential because each of the recorded binary bits has a finite magnetization area associated with it to provide for self-clocking.

The exterior surface of the drum 201 is covered with a polyurethane foam sheet 200, upon which is laid the upper surface or printed side of sheet 21. The ferromagnetic backing 22 carrying the recorded magnetic data is thereby carried by drum 201 as its outer peripheral surface when the system is in use. Backing 22 is normally in contact with the edge of head 191 when binary bits are being read from the record. Because of the resilient nature of sheet 200, FIG. 16, contact between head 191 and backing 22 does not cause excessive damage to the magnetic layer. In fact, it has been found through experimentation, that the same area on backing 22 can be read in excess of 20,000 times even though there is physical contact between the backing 22 and head 191.

Sheet 21 and backing 22, in composite form, are maintained in situ on drum 201 by clamping cams 209 and 210 having the ends affixed to end plates of drum 201. Cams 209 and 210 extend the length of drum 201 and are accommodated for limited movement in enlarged apertures 214 and 215. Each of the plates 211 and 212 is connected to tensioned springs 216 and 217 respectively, that bias rods 209 and 210 into pressing the respective lower and upper edges of the backing 22 against shoulders 218 and 219 sloping radially inwardly of the drum body to define the longitudinal edges of a flat sector 220 of overall rectangular configuration. The apertures 214 and 215 are of sufficient size to allow the rods 209 and 210 to firmly engage both drum shoulders.

The spring bias applied to rods 209 and 210 prevents sheet 21 from being displaced on the drum 201 as the drum rotates. After one edge of backing 22 has been clamped in situ by rod 209, the sheet is wound about foam layer 200 and the other edge of the backing is pulled over the shoulder 219. Rod 210 is raised from the shoulder 219 and the other edge of the backing is smoothed down and over the shoulder 219. The rod 210 is then released and allowed to snap into place holding the paper firmly against foam layer 200 covering the shoulder 219 during drum rotation.

To move reading head 191 relative to backing 22 after each character on a particular line has been read, the head is clamped to the vertical extension 221 of a block 222, FIGS. 15 and 17, which is horizontally indexed to traverse the surface 200. The block 222 slides upon a rail 223 fixedly mounted at both ends thereof to vertical supports 224. The rail 223 is parallel to the axis of rotation of the drum 201.

The block 222 includes a bearing 225 which mounts a pawl 226 for rotation. Pawl 226 engages teeth 228 of rack 229 that is reciprocally driven by rotation of an eccentric cam 231, an increment equal to the distance between the apecies of adjacent rack teeth. This distance is equal to the center-to-center lateral distance between adjacent discrete magnetized areas.

Hence, with reference to FIG. 1, the peak-to-peak distance between the rack teeth 228 would be equal to the magnetic track spacing or type line spacing. Cam 231 is coupled to the output shaft of solenoid 232 which is energized each time that a complete line of characters on backing 22 has been read and decoded. Activation of solenoid 232 causes cam 231 to be rotated through one-quarter of a revolution, whereby pawl 226 is indexed along the teeth 228 of rack 229 from right to left, as viewed in FIG. 17, the distance of one character. To maintain rack 229 in alignment with bar 223 and reading head 191 in contact with backing 22, the rack is mounted for reciprocation parallel to the rail 223 on bearings 234 suitably nested in the supports 224.

Figure 18:
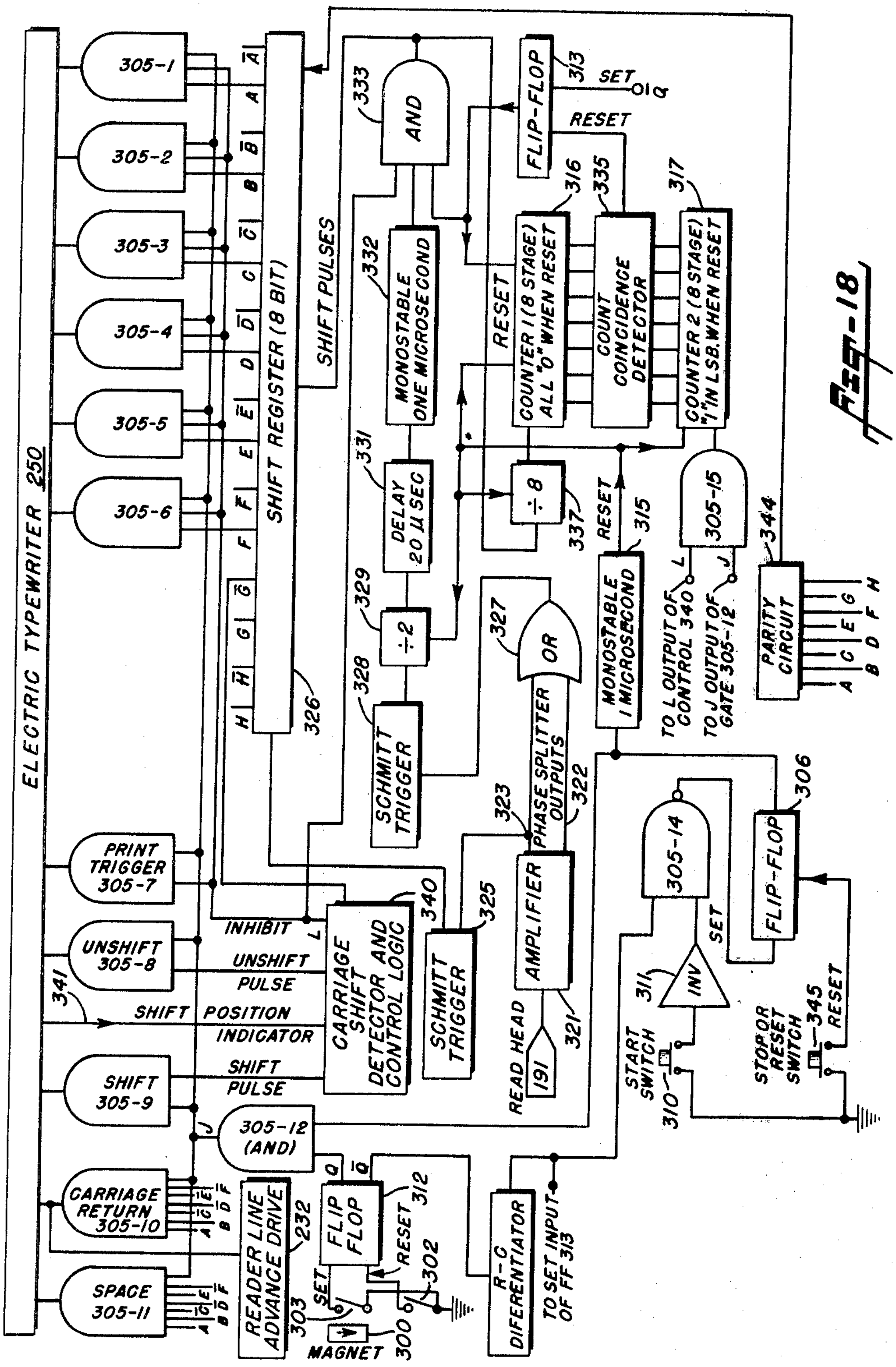
FIG. 18 is a block diagram of circuitry for reading or printing out information received and decoded from the reading apparatus of FIG. 15.

Circuitry suitable for decoding or reading information from magnetic read-out head 191 and coupling the information to an appropriate output device such as typewriter 250 is schematically illustrated in FIG. 18. In a typical system, the read-out system will generally be at a location removed from head 191. In lieu of typewriter 250, the decoded signals may be employed as the read-in for a computer or the like.

Since the record 22 includes no timing channels and rotation thereof is not necessarily synchronous because the magnetic bits are self-clocking, apparatus is provided in the decoding system for establishing pulses required for sensing a particular character. In addition, because the typewriter 250 is unable to respond at the same speed as bits are derived from head 191, provision is made to reduce the rate at which signals are applied to the typewriter. To this end, typewriter 250 prints only a single character for each revolution of drum 201. Hence, during the first revolution of a particular line, the first character recorded on backing 22 is printed by typewriter 250, during the second revolution of drum 201 for the same line, the typewriter prints the second character, and so on.

To establish the self-clocking feature and enable only a single character to be printed by typewriter 250 during each revolution of drum 201 a magnet 300 is mounted to project from one end plate 301 of the drum 201. Mounted stationary in alignment with the path of magnet rotation are reed switches 302 and 303. The switches 302 and 303 are oriented such that magnet 300 closes the switch 303 just after the drum 201 rotates the sheet 21 from contact with the read head 191 and then closes the switch 302 just before the sheet 21 resumes contact with the read head. Switches 302 and 303 reopen after the magnet passes them. The read head, from the time switch 303 closes until switch 302 closes (just before the magnetic sheet again makes contact with the read head) defines a dead zone or time interval during which the typewriter 250 is operated to type out the decoded character on a suitable medium. One character is typed out for each complete revolution, except for a typewriter carriage shift from lower to upper case characters or a shift from upper to lower case characters. Carriage shifting requires one full revolution of the drum.

SYSTEM FOR OPERATING AN ELECTRIC TYPEWRITER TO PRINT OUT RECORDED INFORMATION

With reference to FIG. 18, power is first applied to all components of the drum reader system, except the eleven AND gates 305-1 . . . 305-11. With the sheet 21 properly positioned on the drum, the drum has the magnetically recorded information (for the line that is to be typed out) aligned with the read head 191 which has been previously moved to its extreme right-hand position as viewed in FIG. 15. Flip-flop 306 is reset by momentarily pressing push-button switch 345. This provides an inhibit signal to AND gate 305-12 and will prevent typeout after applying power to all of the gates 305-1 . . . 305-11. Power is then applied to these gates that control operation of electric typewriter 250.

To start the type out it is necessary to momentarily press push-button switch 310. Normal reaction time of a person pressing the switch 310 should insure it being depressed for at least one reader drum revolution. The signal generated by switch 310 is inverted by inverting amplifier 311 and "ANDED" with the differentiated output from flip-flop 312. This occurs when switch 302 is closed by the magnet 300 rotating past it causing flip-flop 312 to be reset. The differentiated output of flip-flop 312 is applied to the SET input of flip-flop 313 causing this flip-flop to set. Flip-flop 306 is also simultaneously SET and upon changing state removes an inhibit signal from gate 305-12 which, however, still remains inhibited because of the inhibit signal provided at the Q input thereof by flip-flop 312. Thus, the AND gates 305-1 . . . 305-11 and 305-15 are inhibited. With gates 305-1 . . . 305-11 inhibited, all data transfer to typewriter 250 is also inhibited. When flip-flop 306 sets, it also triggers monostable multivibrator 315 which resets a first counter 316 to all binary zeroes (0's), and simultaneously resets a second counter 317 to all 0's except for a 1 which is automatically placed in the least significant bit counter stage. Any output from the counter 317 caused by the resetting of that counter is also inhibited. The system therefore is fully reset just before the backing 22 makes contact with the read head 191.

When the backing 22 makes initial contact with the read head, the relatively low amplitude signal (about 15 millivolts peak-to-peak) generated at the read head 191 output is amplified by amplifier 321. The pulse generated by the positive half cycle of the signal appears at amplifier output 322 and the pulse generated by the negative half cycle appears at amplifier output 323. The pulse appearing at amplifier output 323 triggers a Schmitt trigger circuit 325 which serves to square up the signal waveform at output 323 so that it can be sampled and cause information to be shifted into a shift register 326 when a shift pulse occurs. The 322 and 323 outputs from amplifier 321 are "OR'D" together by an OR gate 327 and squared by Schmitt trigger 328 and then divided by 2 by a divider circuit 329. The output of circuit 329 is delayed by means of a conventional delay circuit 331 for about 20 microseconds and applied to an input of an AND gate 333 by way of monostable 332 which shapes received pulses into suitable shift pulses. Thus, each full period of the input from the read head 191 produces a single phase that is time delayed sufficiently to sample the second half of the input waveform at substantially the center of its squared-up waveform. After eight successive waveforms have been sampled representing a particular recorded character in the line being scanned and the eight representative pulses created therefrom are fed serially into the shift register 326 and into a divide-by-eight circuit 337 coupled to the output of AND gate 333. Upon receiving eight successive pulses, the circuit 337 puts a count of 1 into the least significant stage of the counter 316 and since counter 317 was previously reset to a count of 1 a coincidence in count between the least significant stages of two counters is detected by count coincidence detector 335 and a reset pulse is generated by the detector 335. This pulse causes flip-flop 313 to reset and also reset counter 316, and inhibit the gate 333 from feeding any more shift pulses into the register 326 or into the circuit 337. Thus, the eight bits representing the first character are stored in the shift register. When the magnetic backing 22 rotates beyond contact with the read head 191, switch 303 closes and sets flip-flop 312 which causes the inhibit signal to be removed from the Q flip-flop output and AND gate 305-12 for a time interval beginning at the instant switch 303 closes and extending to the time when switch 302 closes. During the interval the gate 305-12 is enabled and in turn enables the gates 305-1 . . . 305-11 thereby permitting the coded information that was previously serially fed into the shift register 326 to be read out in parallel and supplied to the electric typewriter 250. The typewriter receives a six bit binary code via gates 305-1 . . . 305-6 and a print trigger pulse via gate 305-7 that causes the typewriter 350 to type out the corresponding character.

Closure of switch 303 also caused flip-flop 312 to send in another count to counter 317 by enabling AND gates 305-12 and 305-15 assuming no typewriter shift is required. With a count of two in the counter 317, the next cycle initiated when switch 302 closes again will cause the binary pulses fed serially into the shift register 326 to be stopped after the eight bits associated with the second magnetically recorded character has been stored in the register 326. As the second group of pulses representing bits of the second character are fed into the register 326, the first group of bits representing the first character is shifted completely out of the shift register. The complete line is read character by character until a carriage return signal is decoded by "AND" gate 305-10.

The logic for enabling the gate 305-10 is coincident enabling signal at output J of gate 305-12, and a six bit logic $AB\overline{CDEF}$ to be obtained by connecting the first six input leads of gate 305-10 to appropriate output leads $AB\overline{CDEF}$ of shift register 326. The shift register generates this logical output when the read head 191 scans a "carriage return" coded area on the backing 22 and stores in the register 326. When the gate 305-10 is enabled the change in output level signals an associated carriage return mechanism in the typewriter 250 to similarly return its carriage. The enabling of the carriage return 305-10 further energizes the solenoid drive 232 to reciprocate the rack 229, FIG. 17, once so as to index the head 191 opposite the next line of characters.

Similarly, the space function is implemented by the AND gate 305-11 receiving coincidental appropriately coded input signals on leads $AB\overline{CDEF}$ from the register 326 and an enabling signal from output J of gate 305-12. Each time the gate 305-11 is enabled, the corresponding spacing mechanism in the typewriter 250 is activated once.

The functions of shift and unshift are performed under the control of a conventional carriage shift detector and control circuit 340. The detector 340 receives a logical input from the seventh stage of the shift register 326, that is from the lead designated by the letter $\overline{G}$, and in so doing, detects the necessity to shift. When a pulse corresponding to a bit is produced on lead $\overline{G}$, for example, the detector 340 enables the gate 305-9 and disables the gate 305-8 causing the typewriter 250 to shift from lower case characters to upper case characters. Type out and further feeding of shift pulses to the register 326 is inhibited for one complete drum revolution to permit the shift to be accomplished.

An 0 bit on lead $\overline{G}$ drives the logic 340 to inhibit the gate 305-9 and enable the gate 305-8 thereby causing the typewriter to unshift to lower case or remain in the lower case if previously in lower case. The shift position of the typewriter is monitored and as a check may be fed back to the logic 340 by way of lead 341 for comparison with the state of the control logic circuitry. A parity circuit 344 is also incorporated in system to inhibit further typeout or to leave a space if parity is not maintained. A parity circuit (not shown) could also be devised to merely inhibit the typeout of any single character that did not pass parity check.

Type out and operation of the circuitry may be stopped by momentarily pressing push-button switch 345. Closure of switch 345 operates to reset flip-flop 306 which disables the control gate 305-12. To restart the type out it is necessary to momentarily press push-button 310 as 312 previously described.

While we have described and illustrated several specific embodiments of our invention, it will be clear that additional variations of the details of construction which are specifically illustrated and described may be made without departing from the true spirit and scope of the invention as defined in the appended claims.

We claim:

1. The combination of a typewriter apparatus having a plurality of typewriter keys and a magnetic recording system for recording magnetic bits on a magnetizable medium mounted on the typewriter platen, the recording system comprising a plurality of stages for producing high-ampereage currents, the flow directions of certain currents being different and coded to represent different ones of the typewriter keys, each of said stages including a first and a second control device having at least one control electrode, an output electrode and a third electrode, first and second capacitors under the control of said devices, the first capacitor coupling the output electrode of said second device to the third electrode of said first device and the second capacitor coupling the output electrode of said first device to the third electrode of said second device, means for charging said capacitors prior to actuation of a typewriter key, means coupled to the control electrodes of said devices and responsive to actuation of a typewriter key for activating one said devices, whereby one of said capacitors discharges current through the output electrode of the one device, and a conductor associated with each of said stages mounted adjacent said platen and said medium and connected to the one output electrode for inducing a magnetic flux in said magnetic medium of polarity determined by the direction of current flow in said conductor.

2. The combination as claimed in claim 1 which additionally comprises, means for selectively deactivating said control devices of all said stages to prevent magnetization of said medium upon activation of certain of the typewriter keys.

3. The combination as claimed by claim 2 which additionally comprises, means activated by a shift key on the typewriter for generating a predetermined current flow in one of said conductors of a change from lower to upper case.

4. The combination of a typewriter apparatus having a plurality of keys and a system for recording an erasing discrete magnetized areas on a magnetizable medium mounted in the typewriter apparatus comprising, a recording head having a plurality of parallel juxtaposed conductors facing said medium in adjacency therewith, first means for generating current flows to certain ones of said conductors upon actuation of a selected key in directions which represent such key whereby a first discrete area of the medium is magnetized by induction from the currents, and second means responsive to actuation of said selected key for generating current flows in other ones of said conductors to magnetically erase a second discrete area of the medium contiguous to the first area and in the direction of medium movement in the typewriter.

5. The combination as claimed in claim 4 wherein said other ones of said conductors are interleaved with said certain ones of said conductors and wherein said selected key is a back space key, whereby activation of said backspace key erases and area prior to recording thereon.

6. The combination as claimed in claim 4 wherein the other ones of said conductors are positioned on each side of said certain ones of said conductors to effect erasure of areas fringing said first discrete area, and means coupling the second generating means to all of said other ones of said conductors.

7. The combination as claimed in claim 4 which further comprises means for selectively applying the second generating means to said certain ones of said conductors.

* * * * *